(12) United States Patent
Kim et al.

(10) Patent No.: US 11,818,482 B2
(45) Date of Patent: Nov. 14, 2023

(54) IMAGE SENSOR FOR MEASURING DISTANCE AND CAMERA MODULE INCLUDING THE SAME

(71) Applicant: SAMSUNG ELECTRONICS CO., LTD., Suwon-si (KR)

(72) Inventors: Daeyun Kim, Asan-si (KR); Myoungoh Ki, Seongnam-si (KR); Seungchul Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/945,688

(22) Filed: Sep. 15, 2022

(65) Prior Publication Data

US 2023/0077551 A1   Mar. 16, 2023

(30) Foreign Application Priority Data

Sep. 16, 2021  (KR) .......... 10-2021-0124267
Mar. 10, 2022  (KR) .......... 10-2022-0030323

(51) Int. Cl.
*H04N 25/705*   (2023.01)
*H04N 25/71*    (2023.01)

(52) U.S. Cl.
CPC ......... *H04N 25/705* (2023.01); *H04N 25/745* (2023.01)

(58) Field of Classification Search
CPC .. H04N 25/705; H04N 25/745; G01S 7/4816; G01S 17/10; G01S 17/894; H01L 27/146
See application file for complete search history.

(56) References Cited

U.S. PATENT DOCUMENTS 9,435,891 B2   9/2016 Oggier
9,442,196 B2   9/2016 Buettgen et al.
(Continued)

FOREIGN PATENT DOCUMENTS

JP        2020-8483 A    1/2020
KR  10-2020-0098337 A    8/2020
(Continued)

OTHER PUBLICATIONS

Extended European Search Report dated Feb. 14, 2023 for European Patent Application No. 22194151.1.

*Primary Examiner* — Nhan T Tran
(74) *Attorney, Agent, or Firm* — Sughrue Mion, PLLC

(57) ABSTRACT

An image sensor and a camera are provided. The image sensor includes: a demodulation clock generation circuit configured to generate first to fourth demodulation clock signals respectively having first to fourth phases; a demodulation phase selection circuit configured to generate first to fourth pre-demodulation signals based on the first to fourth demodulation clock signals and a random number that changes for each of a plurality of packets; a delay circuit configured to generate a first delay signals, second delay signals, third delay signals and fourth delay signals by delaying the first to fourth pre-demodulation signals by a plurality of delay phases; and a phase mixer configured to generate first to fourth demodulation signals of which phases are changed based on an address that changes for each of the plurality of packets. The first to fourth phases have a phase difference of 90° from each other.

20 Claims, 15 Drawing Sheets

(56) References Cited

U.S. PATENT DOCUMENTS

| | | | |
|---|---|---|---|
| 9,538,101 B2 | 1/2017 | Lee et al. | |
| 9,857,469 B2 | 1/2018 | Oggier et al. | |
| 11,467,264 B2* | 10/2022 | Choi | G01S 7/4865 |
| 11,513,222 B2 | 11/2022 | Kim et al. | |
| 2019/0174123 A1 | 6/2019 | Munro | |
| 2020/0013811 A1* | 1/2020 | Jin | H01L 27/14812 |
| 2020/0185439 A1* | 6/2020 | Jin | H01L 27/14609 |
| 2020/0256991 A1* | 8/2020 | Kim | H04N 25/745 |
| 2021/0063576 A1 | 3/2021 | Gupta et al. | |
| 2021/0080554 A1 | 3/2021 | Kang et al. | |
| 2021/0149028 A1 | 5/2021 | Gong et al. | |
| 2021/0183086 A1 | 6/2021 | Wong | |
| 2022/0107421 A1 | 4/2022 | Kim et al. | |
| 2023/0261029 A1* | 8/2023 | Ebiko | H01L 27/14647 257/431 |

FOREIGN PATENT DOCUMENTS

| | | |
|---|---|---|
| KR | 10-2021-0034301 A | 3/2021 |
| KR | 10-2022-0045834 A | 4/2022 |

\* cited by examiner

IMAGE SENSOR FOR MEASURING DISTANCE AND CAMERA MODULE INCLUDING THE SAME

CROSS-REFERENCE TO RELATED APPLICATIONS

This application claims priority under 35 U.S.C. § 119 to Korean Patent Application Nos. 10-2021-0124267, filed on Sep. 16, 2021, and 10-2022-0030323, filed on Mar. 10, 2022, in the Korean Intellectual Property Office, the disclosures of which are incorporated by reference herein in their entireties.

BACKGROUND

The present disclosure relates to an image sensor, and more particularly, to an image sensor for measuring a distance and a camera including the same.

A time-of-flight (ToF)-based image sensor may generate a three-dimensional image of an object by measuring a distance to the object. The ToF-based image sensor may obtain information about the distance to the object by irradiating light to the object and measuring a light flight time until the light reflected from the object is received. Because distance-related information includes noise due to various factors, it is necessary to minimize noise in order to obtain accurate information.

SUMMARY

The present disclosure provides an image sensor for distance measurement capable of reducing read noise and a camera including the image sensor.

According to an aspect of an example embodiment, an image sensor includes: a demodulation clock generation circuit configured to generate first to fourth demodulation clock signals respectively having first to fourth phases; a demodulation phase selection circuit configured to generate first to fourth pre-demodulation signals based on the first to fourth demodulation clock signals and a random number that changes for each of a plurality of packets; a delay circuit configured to generate a plurality of first delay signals by delaying the first pre-demodulation signal by a plurality of delay phases, a plurality of second delay signals by delaying the second pre-demodulation signal by the plurality of delay phases, a plurality of third delay signals by delaying the third pre-demodulation signal by the plurality of delay phases, and a plurality of fourth delay signals by delaying the fourth pre-demodulation signal by the plurality of delay phases; and a phase mixer configured to generate a plurality of first demodulation signals of which phases are changed based on an address that changes for each of the plurality of packets, a plurality of second demodulation signals of which phases are changed based on the address, a plurality of third demodulation signals of which phases are changed based on the address, and a plurality of fourth demodulation signals of which phases are changed based on the address. The first to fourth phases have a phase difference of 90° from each other.

According to an aspect of an example embodiment, an image sensor includes: a pixel array including a first group of pixels and a second group of pixels; and a control circuit configured to provide a modulation signal to a light source and provide, to the pixel array, a plurality of first demodulation signals of which phases are changed, based on a random number and an address, a plurality of second demodulation signals of which phases are changed based on the random number and the address, a plurality of third demodulation signals of which phases are changed based on the random number and the address, and a plurality of fourth demodulation signals of which phases are changed based on the random number and the address. The first to fourth demodulation signals provided to the first group of pixels have different phases than the first to fourth demodulation signals provided to the second group of pixels, an integration time corresponding to one frame includes a plurality of packets, and the random number and the address are changed for each of the plurality of packets.

According to an aspect of an example embodiment, a camera includes: a light source; and an image sensor. The image sensor includes: a pixel array including a plurality of pixels configured to receive a light signal generated by the light source and reflected from an object; and a control circuit configured to provide a modulation signal to the light source and provide, to the pixel array, a plurality of first demodulation signals of which phases are changed based on a random number and an address, a plurality of second demodulation signals of which phases are changed based on the random number and the address, a plurality of third demodulation signals of which phases are changed based on the random number and the address, and a plurality of fourth demodulation signals of which phases are changed based on the random number and the address. An integration time corresponding to one frame includes a plurality of packets, and the random number and the address are changed for each of the plurality of packets.

BRIEF DESCRIPTION OF THE DRAWINGS

The above and other aspects and features will be more apparent from the following description of example embodiments taken in conjunction with the accompanying drawings, in which.

DETAILED DESCRIPTION

Hereinafter, example embodiments will be described in detail with reference to the accompanying drawings. Embodiments described herein are provided as examples, and thus, the present disclosure is not limited thereto, and may be realized in various other forms. Each example embodiment provided in the following description is not excluded from being associated with one or more features of another example or another embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
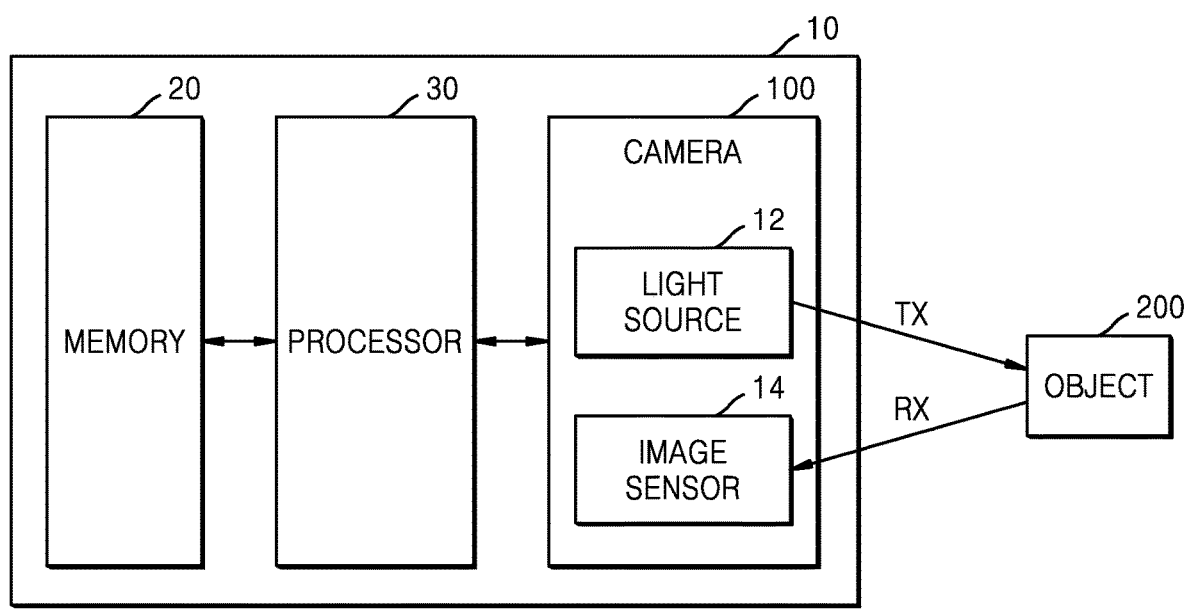
FIG. 1 is a schematic configuration diagram of a system according to an example embodiment.

FIG. 1 is a schematic configuration diagram of a system according to an example embodiment.

Referring to FIG. 1, a system 10 may include a processor 30 and a camera 100. The system 10 may further include a memory 20 connected to the processor 30 to store information, such as image data, received from the camera 100. In an example embodiment, the system 10 may be integrated into one semiconductor chip, and each of the camera 100, the processor 30, and the memory 20 may be implemented as a separate semiconductor chip. The memory 20 may include one or more memory chips. In an example embodiment, the processor 30 may include multiple processing chips.

The system 10 may be an electronic device, and may use an image sensor for distance measurement. The system 10 may be portable or stationary. Examples of portable forms of the system 10 include mobile devices, cell phones, smartphones, user equipment (UEs), tablets, digital cameras, laptop or desktop computers, electronic smart watches, machine-to-machine (M2M) communication devices, virtual reality (VR) devices or modules, robots, and the like. Examples of stationary forms of the system 10 include game consoles in video game rooms, interactive video terminals, automobiles, mechanical vision systems, industrial robots, virtual reality (VR) devices, driver-side mounted cameras in automobiles, and the like.

The camera 100 may include a light source 12 and an image sensor 14. The light source 12 may generate a transmission optical signal TX, which may be incident on an object 200. The transmission optical signal TX output from the light source 12 may be reflected by the object 200, and a received light signal RX reflected from the object 200 may be received by the image sensor 14. The image sensor 14 may obtain depth information, for example distance information about the object 200, by using time-of-flight (ToF).

The light source 12 may include a light source (e.g., a light emitting diode (LED)) and a light source driver driving the light source. The image sensor 14 may include a pixel array, a control circuit for driving the pixel array, and a readout circuit for reading out a pixel signal output from the pixel array.

The processor 30 may be a central processing unit (CPU), which is a general-purpose processor. In an example embodiment, in addition to the CPU, the processor 30 may further include a microcontroller, a digital signal processor (DSP), a graphics processing unit (GPU), an application specific integrated circuit (ASIC) processor, and the like. In addition, the processor 30 may include more than one CPU operating in a distributed processing environment. In an example embodiment, the processor 30 may be a system on chip (SoC) having additional functions to the functions of the CPU.

The processor 30 may control operations of the light source 12 and the image sensor 14. In an example embodiment, the system 10 may be controlled by a user and may include a mode switch to switch between a two-dimensional (2D) imaging mode and a three-dimensional (3D) imaging mode. When the user selects the 2D imaging mode using the mode switch, the processor 30 may activate the image sensor 14 and the light source 12 may not be activated because the 2D imaging mode uses ambient light.

When the user selects the 3D imaging mode using the mode switch, the processor 30 may activate both the light source 12 and the image sensor 14. The processed image data received from the readout circuit may be stored in the memory 20 by the processor 30. The processor 30 may display the 2D or 3D image selected by the user on a display screen of the system 10. The processor 30 may be programmed with software or firmware to perform the various processing tasks described. In an example embodiment, the processor 30 may include programmable hardware logic circuits for performing some or all of the functions described above. For example, the memory 20 may allow the processor 30 to perform a corresponding function by storing program code, a lookup table, or intermediate operation results.

The memory 20 may be, for example, a dynamic random access memory (DRAM), such as a synchronous DRAM (SDRAM), a high bandwidth memory (HBM), or a DRAM-based 3D Stack (3DS) memory, such as hybrid memory cube (HMC) memory. The memory 20 may be, for example, a solid state drive (SSD), a DRAM, or a semiconductor-based storage, such as static random access memory (SRAM), phase-change random access memory (PRAM), resistive random access memory (RRAM), conductive-bridging RAM (CBRAM), magnetic RAM (MRAM), spin-transfer torque MRAM (STT-MRAM).

Figure 2:
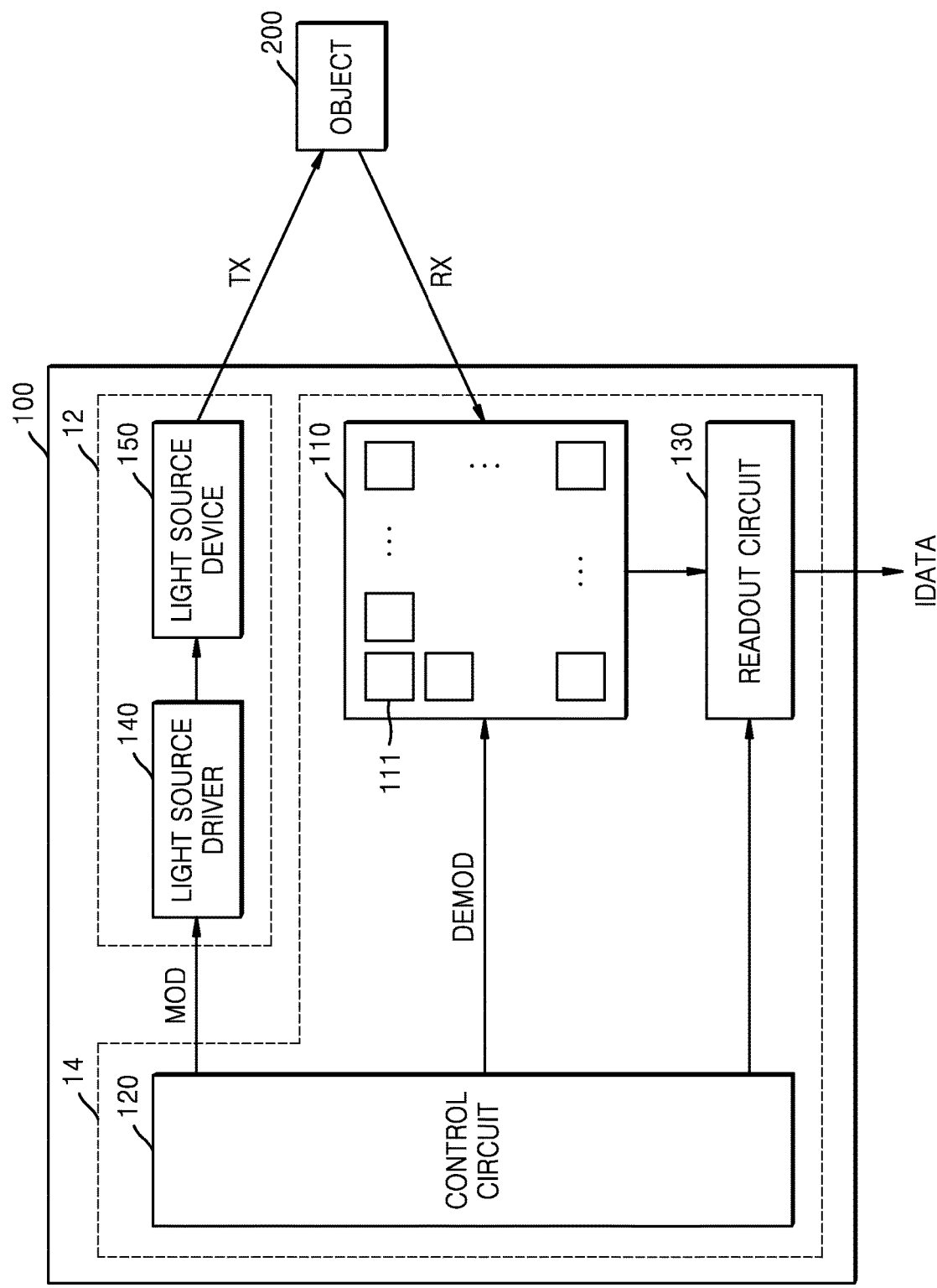
FIG. 2 is a configuration diagram for explaining a camera according to an example embodiment.

FIG. 2 is a configuration diagram for explaining a camera according to an example embodiment Referring to FIGS. 1 and 2, the camera 100 may be used to obtain distance information about the object 200. The distance information may be calculated by the processor 30 based on image data IDATA output from the image sensor 14, or may be calculated by itself inside the image sensor 14. In an example embodiment, the distance information may be used by the processor 30 as part of a 3D user interface to enable interaction with the 3D image of the object 200 as part of a game or another application running on the system 10 by a user of system 10, or to enable to use a 3D image of the object 200 formed in three dimensions.

The light source 12 may include a light source driver 140 and a light source device 150. The light source 12 may further include a lens.

The light source device 150 may transmit a transmission optical signal TX to the object 200. The light source device 150 may be a laser diode (LD) or light emitting diode (LED) which may emit infrared or visible light, a monochromatic illumination source that is a combination of a near-infrared laser (NIR), a point light source, a white lamp, and a monochromator, or a combination of other laser light sources. For example, the light source device 150 may be a vertical-cavity surface-emitting laser (VCSEL). In an example embodiment, the light source device 150 may output an infrared transmission optical signal TX having a wavelength of about 800 nm to about 1000 nm.

The light source driver 140 may generate a driving signal for driving the light source device 150. The light source driver 140 may drive the light source device 150 according to a modulation signal MOD received from a control circuit 120.

The image sensor 14 may measure distance or depth using the ToF principle. The image sensor 14 may receive the received light signal RX reflected from the object 200. The image sensor 14 may include a pixel array 110, a control circuit 120, and a readout circuit 130. The image sensor 14 may further include a lens, and the received light signal RX may be provided to the pixel array 110 through the lens.

The pixel array 110 may include a plurality of pixels 111. The plurality of pixels 111 may operate in a ToF method. The structure of each of the plurality of pixels 111 is described later with respect to FIG. 3.

The pixel array 110 may be an RGB pixel array in which different pixels collect different light colors (e.g., a first pixel may collect red light, a second pixel may collect green light and a third pixel may collect blue light). The pixel array 110 may be, for example, a 2D sensor, such as a 2D RGB sensor having an infrared (IR) blocking filter, a 2D infrared (IR) sensor, a 2D near infrared (NIR) sensor, a 2D RGBW sensor, a 2D RGB-IR sensor, or the like. The system 10 may use the same pixel array 110 not only for measuring the distance to the object 200, but also for imaging the 2D RGB color of the object 200 (or the scene containing the object).

The pixel array 110 may convert the received optical signal RX into electrical signals, that is, pixel signals. The readout circuit 130 may generate the image data IDATA based on pixel signals output from the pixel array 110. For example, the readout circuit 130 may perform analog-to-digital conversion on the pixel signals.

The image sensor 14 may further include a memory and an image signal processor. The image data IDATA may be stored in the memory, and the image signal processor may process the image data IDATA to calculate distance information or depth information. The memory or the image signal processor may be provided outside the image sensor 14.

The control circuit 120 may control components of the image sensor 14 (e.g., the pixel array 110 and the readout circuit 130), and may control the light source driver 140 of the light source 12. The control circuit 120 may transmit the modulation signal MOD to the light source driver 140, and may transmit a demodulation signal DEMOD corresponding to the modulation signal MOD to the pixel array 110. The demodulation signals DEMOD may refer to signals for controlling each of the transfer transistors included in each of the pixels 111, but are not limited thereto.

The control circuit 120 may generate the modulation signal MOD and the demodulation signals DEMOD corresponding to the modulation signal MOD based on a random number. Accordingly, the image sensor 14 may remove noise (e.g., multi user interference (MUI)) generated in the received optical signal RX due to an optical signal generated by another device, such as a camera other than the camera 100, by converging into a random noise component.

In addition, the control circuit 120 may provide a demodulation signal DEMOD having a different delay phase for each of a plurality of pixel groups included in the pixel array 110, and may provide a demodulation signal DEMOD having a different delay phase for each packet within the integration time to one pixel group. For example, the number of packets within one integration time may correspond to a number of pixel groups. Accordingly, a peak current of the demodulation signals DEMOD generated in the pixel array 110 may be reduced, and thus, electromagnetic interference (EMI) may be reduced, a high-speed modulation operation may be possible, and deterioration due to a depth pixel fixed-pattern (PFPN) may be prevented.

Figure 3:
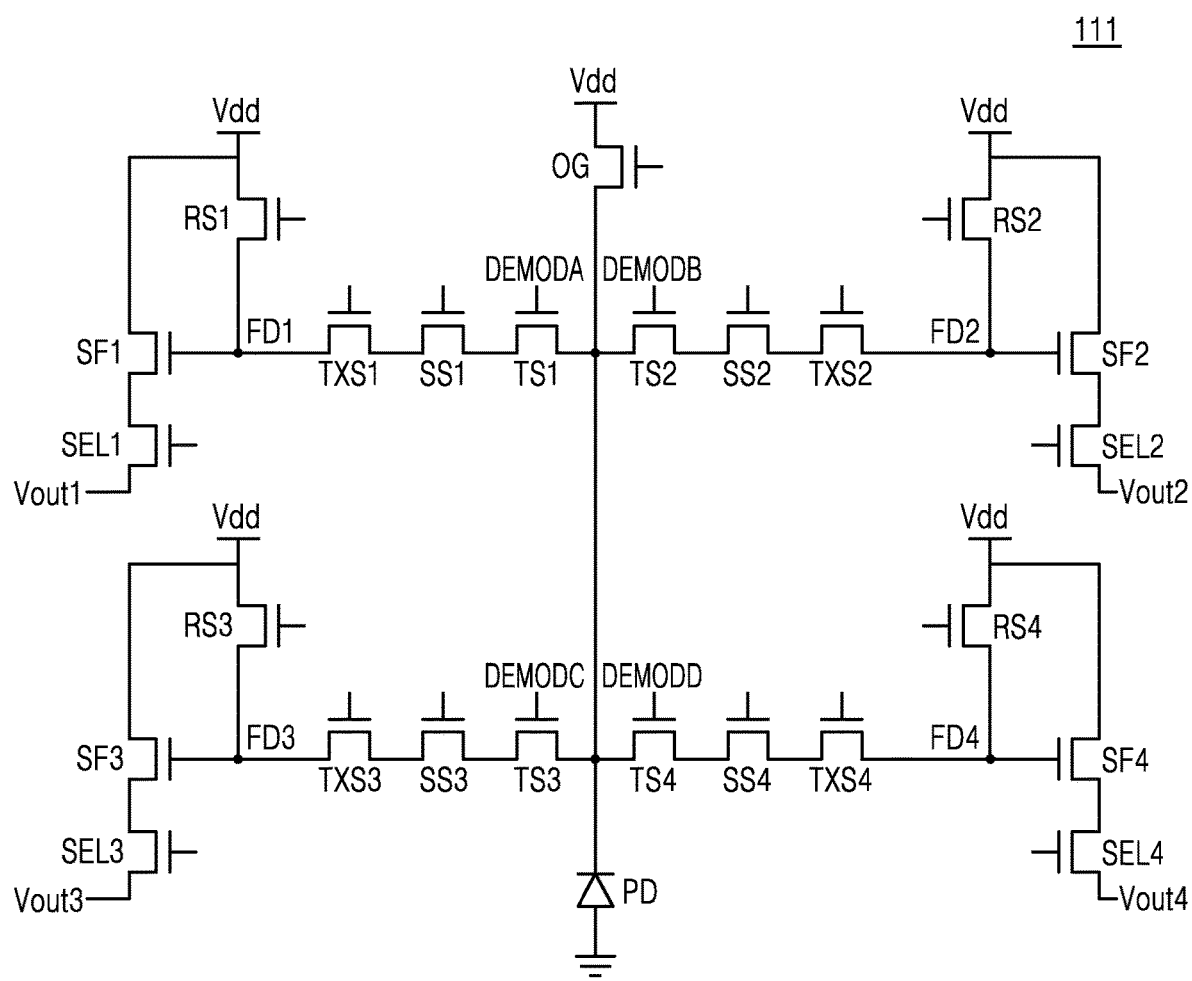
FIG. 3 is a view for explaining an example embodiment of the structure of the pixel shown in FIG. 2.

FIG. 3 is a view for explaining an example embodiment of the structure of the pixel 111 shown in FIG. 2.

As illustrated in FIG. 3, the pixel 111 may have a 4-tap structure. The 4-tap structure indicates a structure in which one pixel 111 includes four taps, and the tap may refer to a component capable of discriminating and transmitting the photocharges generated and accumulated in the pixel 111 for each phase as an external optical signal is irradiated by different phases.

An image sensor including pixels 111 having the 4-tap structure (e.g., the image sensor 14 in FIG. 2) may implement a method of transmitting with respect to 0°, 90°, 180°, and 270° phases using four taps. For example, the first tap of the pixel 111 may generate the first pixel signal Vout1 with respect to a phase of 0°, the second tap may generate a second pixel signal Vout2 with respect to a phase of 90°, the third tap may generate a third pixel signal Vout3 with respect to a phase of 180°, and the fourth tap may generate a fourth pixel signal Vout4 with respect to a phase of 270°.

Referring to FIG. 3, the pixel 111 may include a photodiode PD, an overflow gate OG, transfer transistors TS1 to TS4, storage transistors SS1 to SS4, tap transfer transistors TXS1 to TXS4, reset transistors RS1 to RS4, source followers SF1 to SF4, and selection transistors SEL1 to SEL4. According to an example embodiment, at least one of the overflow gate OG, the storage transistors SS1 to SS4, the tap transfer transistors TXS1 to TXS4, the reset transistors RX1 to RX4, the source followers SF1 to SF4, and the select transistors SEL1 to SEL4 may be omitted.

The photodiode PD may generate photocharges that vary depending on the intensity of the received light signal (e.g., RX of FIG. 2). That is, the photodiode PD may convert the received optical signal RX into an electrical signal. The photodiode PD is an example of a photoelectric conversion device, and may be at least one of a photo transistor, a photo gate, a pinned photo diode (PPD), and a combination thereof.

The first to fourth transfer transistors TS1 to TS4 may respectively transmit charges generated by the photodiode PD to the first to fourth storage transistors SS1 to SS4 depending on the first to fourth demodulation signals DEMODA to DEMODD. Accordingly, the first to fourth transfer transistors TS1 to TS4 may respectively transmit the charges generated by the photodiode PD to the first to fourth floating diffusion nodes FD1 to FD4 depending on the first to fourth demodulation signals DEMODA to DEMODD.

The first to fourth demodulation signals DEMODA to DEMODD may be included in the demodulation signals DEMOD of FIG. 2, and may be signals having the same frequency, the same duty ratio and different phases from each other. The first to fourth demodulation signals DEMODA to DEMODD may have a phase difference of 90° from each other. For example, when the first demodulation signal DEMODA has a phase of 0° with respect to the first demodulation signal DEMODA, the second demodulation signal DEMODB may have a phase of 90°, the third demodulation signal DEMODC may have a phase of 180°, and the fourth demodulation signal DEMODD may have a phase of 270°.

The first to fourth storage transistors SS1 to SS4 may store photocharges transferred through each of the first to fourth transfer transistors TS1 to TS4, and the first to fourth tap transfer transistors TXS1 to TXS4 may transfer the photocharge stored in each of the first to fourth storage transistors SS1 to SS4 to the first to fourth floating diffusion nodes FD1 to FD4.

The first to fourth source followers SF1 to SF4 may amplify and output photocharges to the first to fourth selection transistors SEL1 to SEL4, based on the potential due to the photocharge accumulated in the first to fourth floating diffusion nodes FD1 to FD4. The first to fourth selection transistors SEL1 to SEL4 may output the first to fourth pixel signals Vout1 to Vout4 through column lines according to the selection control signals.

The pixel 111 may accumulate photocharges for a predetermined time, for example, an integration time and output the first to fourth pixel signals Vout1 to Vout4 generated depending on the accumulation result to the readout circuit (e.g., the readout circuit 130 of FIG. 2).

The first to fourth reset transistors RS1 to RS4 may reset the first to fourth floating diffusion nodes FD1 to FD4 to the power supply voltage VDD. The overflow gate OG may be a transistor for discharging the overflow charge, the source of the overflow gate OG may be connected to the photodiode PD, and the power supply voltage VDD may be provided to the drain of the overflow gate OG.

Although the pixel 111 illustrated and described with reference to FIG. 3 is a 4-tap structure, example embodiments are not limited thereto. The image sensor 14 may include pixels having different tap structures. For example a pixel may have a two-tap structure, an example of which will be described later with reference to FIG. 11.

Figure 4:
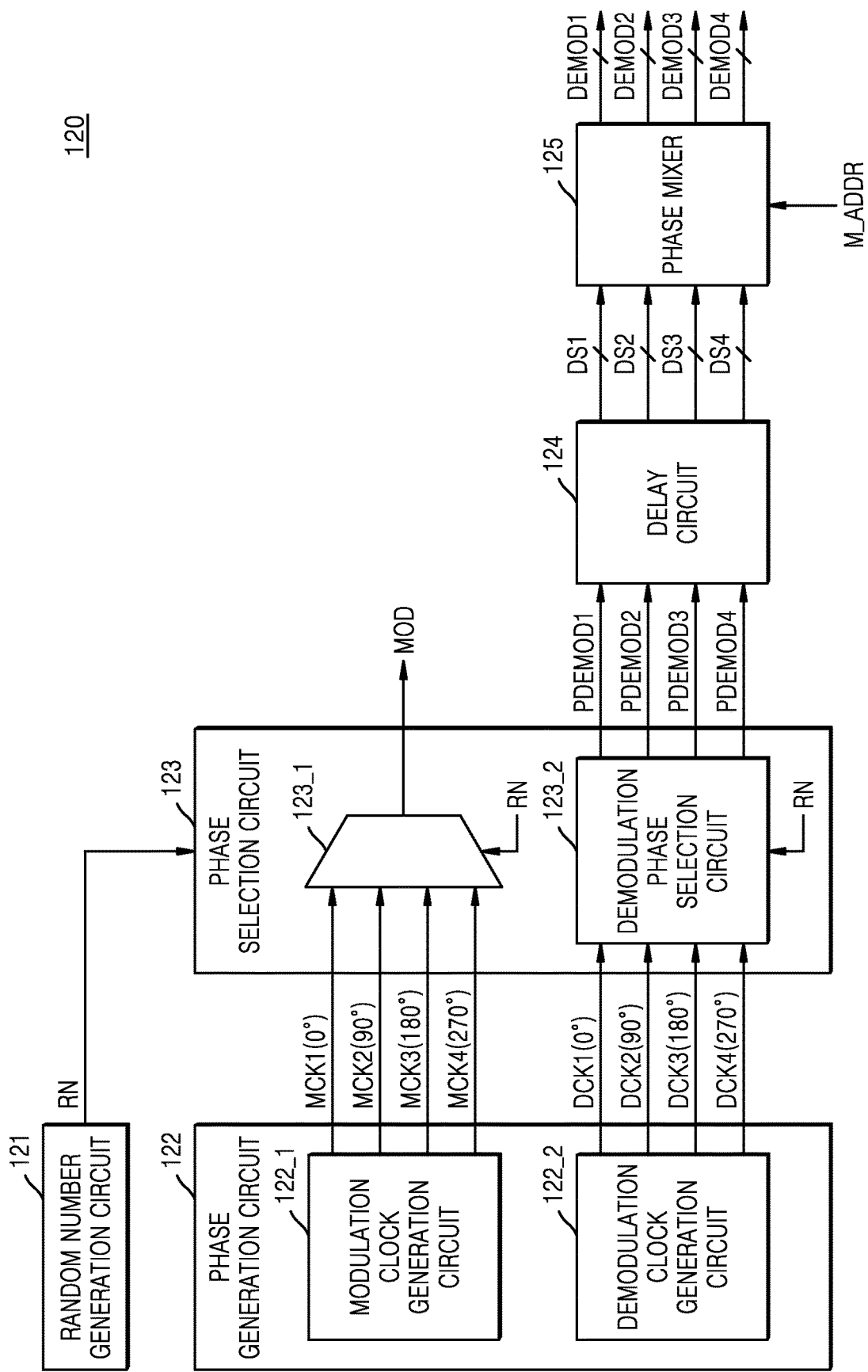
FIG. 4 is a block diagram illustrating a control circuit included in the image sensor according to an example embodiment.
Figure 5:
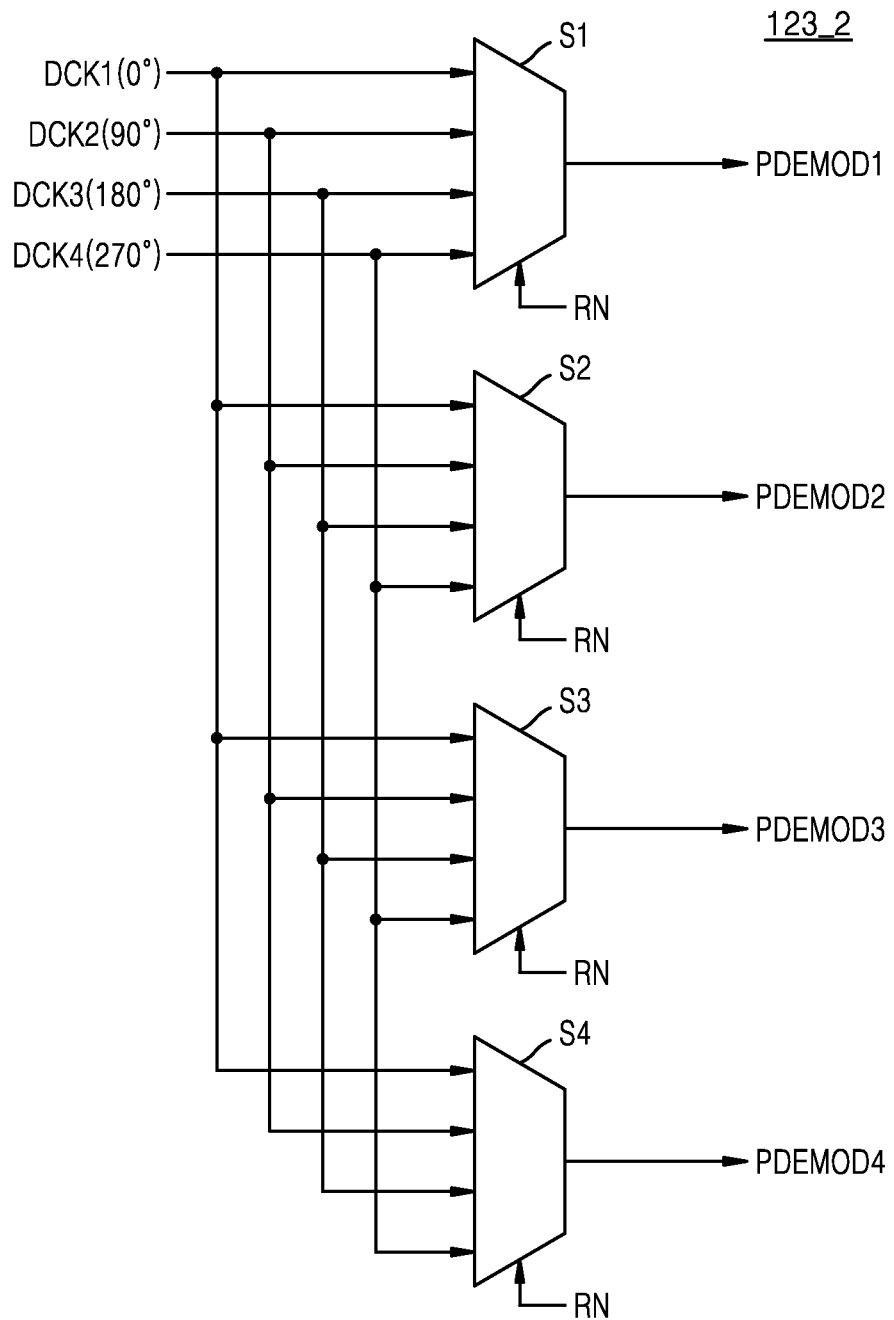
FIG. 5 is a block diagram illustrating a demodulation phase selection circuit of FIG. 4 according to an example embodiment.

FIG. 4 is a block diagram illustrating a control circuit included in the image sensor according to an example embodiment. FIG. 5 is a block diagram illustrating a demodulation phase selection circuit 123_2 of FIG. 4 according to an example embodiment.

Referring to FIG. 4, the control circuit 120 may generate the modulation signal MOD, which may be transmitted to the light source driver (e.g., the light source driver 140 of FIG. 2), and first to fourth demodulation signals DEMOD1 to DEMOD4, which may be transmitted to the pixel array (e.g., the pixel array 110 of FIG. 2). The control circuit 120 may include a random number generation circuit 121, a phase generation circuit 122, a phase selection circuit 123, a delay circuit 124, and a phase mixer 125.

A plurality of packets may be distinguished from one another during an integration time defining one frame. The random number generation circuit 121 may newly generate a random number RN for each packet. For example, the random number generation circuit 121 may generate 2-bit random numbers #1:00, #2:01, #3:10, and #4:11. The control circuit 120 may include a linear feedback shift register (LFSR) instead of the random number generation circuit 121.

The phase generation circuit 122 may include a modulation clock generation circuit 122_1 and a demodulation clock generation circuit 122_2. The modulation clock generation circuit 122_1 may generate a plurality of modulation clock signals, for example, first to fourth modulation clock signals MCK1 to MCK4. The first to fourth modulation clock signals MCK1 to MCK4 may have the same frequency, the same duty ratio, and different phases. For example, the first modulation clock signal MCK1 may have a phase of 0°, the second modulation clock signal MCK2 may have a phase of 90°, the third modulation clock signal MCK3 may have a phase of 180°, and the fourth modulation clock signal MCK4 may have a phase of 270°.

The demodulation clock generation circuit 122_2 may generate a plurality of demodulation clock signals, for example, first to fourth demodulation clock signals DCK1 to DCK4. The first to fourth demodulation clock signals DCK1 to DCK4 may have the same frequency, the same duty ratio, and different phases. For example, the first demodulation clock signal DCK1 may have a phase of 0°, the second demodulation clock signal DCK2 may have a phase of 90°, the third demodulation clock signal DCK3 may have a phase of 180°, and the fourth demodulation clock signal DCK4 may have a phase of 270°. In this case, the first to fourth modulation clock signals MCK1 to MCK4 may have the same frequency as those of the first to fourth demodulation clock signals DCK1 to DCK4.

The phase selection circuit 123 may include a modulation phase selection circuit 123_1 and a demodulation phase selection circuit 123_2. The modulation phase selection circuit 123_1 may receive the first to fourth modulation clock signals MCK1 to MCK4 and output one of the first to fourth modulation clock signals MCK1 to MCK4 as the modulation signal MOD depending on the random number RN.

Referring to FIGS. 4 and 5, the demodulation phase selection circuit 123_2 may receive the first to fourth demodulation clock signals DCK1 to DCK4 and generate the first to fourth pre-demodulation signals PDEMOD1 to PDEMOD4 depending on the random number RN. The first to fourth pre-demodulation signals PDEMOD1 to PDEMOD4 may have the same frequency, the same duty ratio, and different phases.

The demodulation phase selection circuit 123_2 may include first to fourth selection circuits S1 to S4. The first to fourth selection circuits S1 to S4 may respectively receive the first to fourth demodulation clock signals DCK1 to DCK4.

The first selection circuit S1 may generate one of the first to fourth demodulation clock signals DCK1 to DCK4 as the first pre-demodulation signal PDEMOD1 based on the random number RN, and the second selection circuit S2 may generate one of the first to fourth demodulation clock signals DCK1 to DCK4 as the second pre-demodulation signal PDEMOD2 based on the random number RN. The third selection circuit S3 may generate one of the first to fourth demodulation clock signals DCK1 to DCK4 as the third pre-demodulation signal PDEMOD3 based on the random number RN, and the fourth selection circuit S4 may generate one of the first to fourth demodulation clock signals DCK1 to DCK4 as the fourth pre-demodulation signal PDEMOD4 based on the random number RN.

In this case, the demodulation phase selection circuit 123_2 may generate the first to fourth pre-demodulation signals PDEMOD1 to PDEMOD4 so that the second pre-demodulation signal PDEMOD2 has a phase delayed by 90° from the first pre-demodulation signal PDEMOD1, the third pre-demodulation signal PDEMOD3 has a phase delayed by 180° from the first pre-demodulation signal PDEMOD1, and the fourth pre-demodulation signal PDEMOD4 has a phase delayed by 270° from the first pre-demodulation signal PDEMOD1, based on the first pre-demodulation signal PDEMOD1. For example, when the first demodulation clock signal DCK1 is selected as the first pre-demodulation signal PDEMOD1, the second demodulation clock signal DCK2 may be selected as the second pre-demodulation signal PDEMOD2, the third demodulation clock signal DCK3 may be selected as the third pre-demodulation signal PDEMOD3, and the fourth demodulation clock signal DCK4 may be selected as the fourth pre-demodulation signal PDEMOD4. For example, when the second demodulation clock signal DCK2 is selected as the first pre-demodulation signal PDEMOD1, the third, fourth, and first demodulation clock signals DCK3, DCK4, and DCK1 may be selected as the second to fourth pre-demodulation signals PDEMOD2 to PDEMOD4, respectively. For example, when the third demodulation clock signal DCK3 is selected as the first pre-demodulation signal PDEMOD1, the fourth, first, and second demodulation clock signals DCK4, DCK1, and DCK2 may be selected as the second to fourth pre-demodulation signals PDEMOD2 to PDEMOD4, respectively. Alternatively, for example, when the fourth demodulation clock signal DCK4 is selected as the first pre-demodulation signal PDEMOD1, the first, second, and third demodulation clock signals DCK1, DCK2, and DCK3 may be selected as the second to fourth pre-demodulation signals PDEMOD2 to PDEMOD4, respectively.

Referring back to FIG. 4, the delay circuit 124 may receive the first to fourth pre-demodulation signals PDEMOD1 to PDEMOD4 and generate a plurality of first delay signals DS1, a plurality of second delay signals DS2, a plurality of third delay signals DS3, and a plurality of fourth delay signals DS4. In an example embodiment, the delay circuit 124 may be implemented as a buffer chain.

The delay circuit 124 may generate a plurality of first delay signals DS1 by respectively delaying the first pre-demodulation signal PDEMOD1 by a designated plurality of delay phases (for example, 4, 10, 20, or 40 different delay phases, etc.). For example, 40 different delay phases may be designated, respectively, and the delay circuit 124 may generate 40 first delay signals each delayed by the 40 different delay phases from the first pre-demodulation signal PDEMOD1. In addition, the delay circuit 124 may generate a plurality of second delay signals DS2 by respectively delaying the second pre-demodulation signal PDEMOD2 by the designated plurality of delay phases, generate a plurality of third delay signals DS3 by respectively delaying the third pre-demodulation signal PDEMOD3 by the designated plurality of delay phases, and generate a plurality of fourth delay signals DS4 by respectively delaying the fourth pre-demodulation signal PDEMOD4 by the designated plurality of delay phases.

The phase mixer 125 may provide each of the first demodulation signals DEMOD1 obtained by mixing the plurality of first delay signals DS1 to each of the corresponding pixel groups of the pixel array 110, based on an address M_ADDR. For example, if the number of pixel groups is 40, the address M_ADDR may be an integer between one and 40. For example, each of the first demodulation signals DEMOD1 may be provided as a first demodulation signal (e.g., DEMODA of FIG. 3) to a first transfer transistor (e.g., TS1 of FIG. 3) of a pixel (e.g., 111 of FIG. 3) included in a corresponding pixel group. For example, the phase mixer 125 may output a plurality of first delay signals DS1 ordered in different phase ordering manners corresponding to different addresses M_ADDR as the first demodulation signals DEMOD1. In other words, the phase mixer 125 adjusts the serial numbers or indexes of the plurality of first delay signals DS1 differently, such that when the plurality of first delay signals DS1 are output as first demodulation signals DEMOD1 for different addresses M_ADDR, the phases of the first delay signals with the same serial number or index for different addresses M_ADDR of the plurality of first delay signals DS1 are different.

The phase mixer 125 may provide each of the second demodulation signals DEMOD2 to each of the corresponding pixel groups of the pixel array 110 by mixing the plurality of second delay signals DS2 depending on the address M_ADDR. For example, each of the second demodulation signals DEMOD2 may be provided as a second demodulation signal (e.g., DEMODB of FIG. 3) to a second transfer transistor (e.g., TS2 in FIG. 3) of a pixel 111 included in a corresponding pixel group. For example, the phase mixer 125 may output a plurality of second delay signals DS2 ordered in different phase ordering manners corresponding to different addresses M_ADDR as the second demodulation signals DEMOD2.

The phase mixer 125 may provide each of the third demodulation signals DEMOD3 to each of the corresponding pixel groups of the pixel array 110 by mixing the plurality of third delay signals DS3 depending on the address M_ADDR. For example, each of the third demodulation signals DEMOD3 may be provided as a third demodulation signal (e.g., DEMODC of FIG. 3) to a third transfer transistor (e.g., TS3 in FIG. 3) of a pixel 111 included in a corresponding pixel group. For example, the phase mixer 125 may output a plurality of third delay signals DS3 ordered in different phase ordering manners corresponding to different addresses M_ADDR as the third demodulation signals DEMOD3.

In addition, the phase mixer 125 may provide each of the fourth demodulation signals DEMOD4 to each of the corresponding pixel groups of the pixel array 110 by mixing the plurality of fourth delay signals DS4 depending on the address M_ADDR. For example, each of the fourth demodulation signals DEMOD4 may be provided as a fourth demodulation signal (e.g., DEMODD of FIG. 3) to a fourth transfer transistor (e.g., TS4 in FIG. 3) of a pixel 111 included in a corresponding pixel group. For example, the phase mixer 125 may output a plurality of fourth delay signals DS4 ordered in different phase ordering manners corresponding to different addresses M_ADDR as the fourth demodulation signals DEMOD4.

The address M_ADDR may be changed for each specific time interval. For example, the address M_ADDR may be changed for each packet, and the phase mixer 125 may output the plurality of first to fourth demodulation signals DEMOD1 to DEMOD4 of which phases are changed for each packet.

Each of the plurality of first demodulation signals DEMOD1 has a different delay phase from another, each of the plurality of second demodulation signals DEMOD2 has a different delay phase from another, each of the plurality of third demodulation signals DEMOD3 has a different delay phase from another, and each of the plurality of fourth demodulation signals DEMOD3 may have different delay phase from another. Accordingly, a current dispersion effect of the first to fourth demodulation signals DEMOD1 to DEMOD4 may occur and a peak current may decrease. In addition, as the address M_ADDR is changed periodically, because the phases of the first to fourth demodulation signals DEMOD1 to DEMOD4 provided to the pixel array 110 are periodically changed, a depth offset error may be reduced.

Figure 6A:
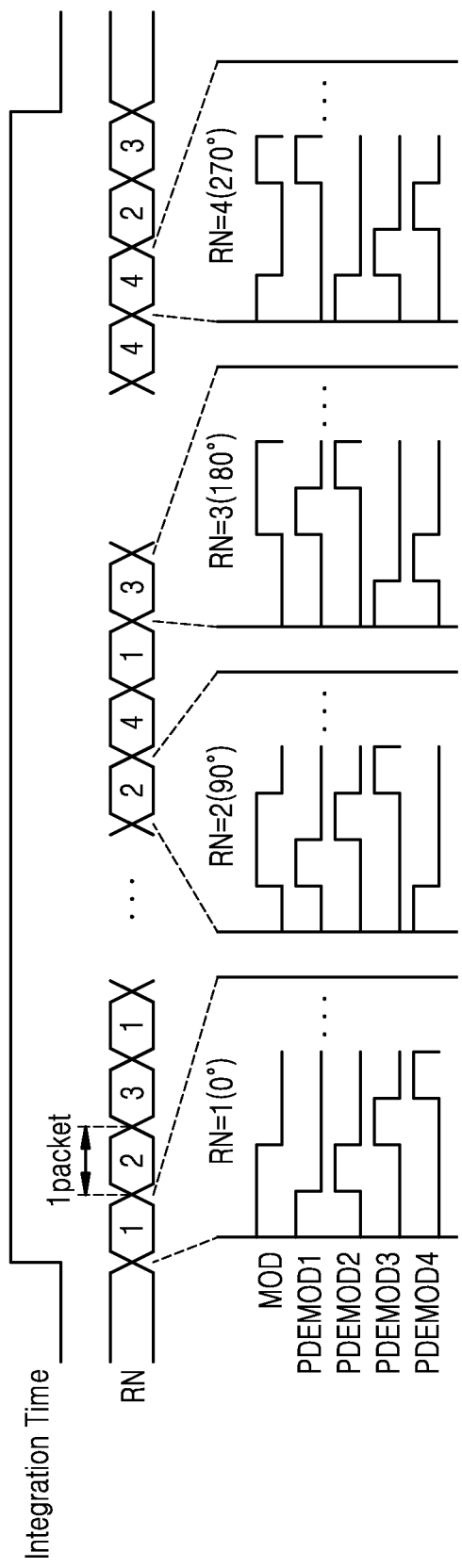
FIG. 6A is a timing diagram illustrating a modulation signal and a plurality of pre-demodulation signals based on a random number according to an example embodiment.

FIG. 6A is a timing diagram illustrating a modulation signal and a plurality of pre-demodulation signals based on a random number. The integration time may be divided into a plurality of packets, and a random number RN may be newly assigned to each of the plurality of packets. In an example embodiment, the random number RN may be 2 bits, and in FIG. 6A, the random number RN may be represented by numbers 1 to 4. However, example embodiments are not limited thereto, and the number of random numbers RN may be variously changed.

Referring to FIGS. 4 and 6A, depending on the random number RN, the modulation signal MOD and the plurality of pre-demodulation signals, for example, the first to fourth pre-demodulation signals PDEMOD1 to PDEMOD4, may be changed together. The modulation signal MOD may have the same period as that of the first to fourth pre-demodulation signals PDEMOD1 to PDEMOD4. In an example embodiment, the modulation signal MOD may have a duty ratio of 50%, and each of the first to fourth pre-demodulation signals PDEMOD1 to PDEMOD4 may have a duty ratio of 25%. However, example embodiments are not limited thereto, and the duty ratio of the modulation signal MOD and the duty ratio of the first to fourth pre-demodulation signals PDEMOD1 to PDEMOD4 may be modified.

For example, when the random number RN is 1, the phase of the modulation signal MOD may be 0°, the phase of the first pre-demodulation signal PDEMOD1 may be 0°, the phase of the second pre-demodulation signal PDEMOD2 may be 90°, the phase of the third pre-demodulation signal PDEMOD3 may be 180°, and the phase of the fourth pre-demodulation signal PDEMOD4 may be 270°.

For example, when the random number RN is 2, the phase of the modulation signal MOD may be 90°, the phase of the first pre-demodulation signal PDEMOD1 may be 90°, the phase of the second pre-demodulation signal PDEMOD2 may be 180°, the phase of the third pre-demodulation signal PDEMOD3 may be 270°, and the phase of the fourth pre-demodulation signal PDEMOD4 may be 0°.

For example, when the random number RN is 3, the phase of the modulation signal MOD is 180°, the phase of the first pre-demodulation signal PDEMOD1 maybe 180°, the phase of the second pre-demodulation signal PDEMOD2 may be 270°, the phase of the third pre-demodulation signal PDEMOD3 may be 0°, and the phase of the fourth pre-demodulation signal PDEMOD4 may be 90°.

In addition, for example, when the random number RN is 4, the phase of the modulation signal MOD maybe 270°, the phase of the first pre-demodulation signal PDEMOD1 may be 270°, the phase of the second pre-demodulation signal PDEMOD2 may be 0°, the phase of the third pre-demodulation signal PDEMOD3 may be 90°, and the phase of the fourth pre-demodulation signal PDEMOD4 may be 180°.

The modulation signal MOD and the first to fourth pre-demodulation signals PDEMOD1 to PDEMOD4 may be changed together depending on the random number RN, and as the first to fourth pre-demodulation signals PDEMOD1 to PDEMOD4 are changed, the first to fourth modulation signals DEMOD1 to DEMOD4 may be changed. As the number of packets included in the integration time increases, noise caused by an optical signal output from another camera may be converted into a random noise component, and the depth measurement accuracy of the image sensor may be improved.

Figure 6B:
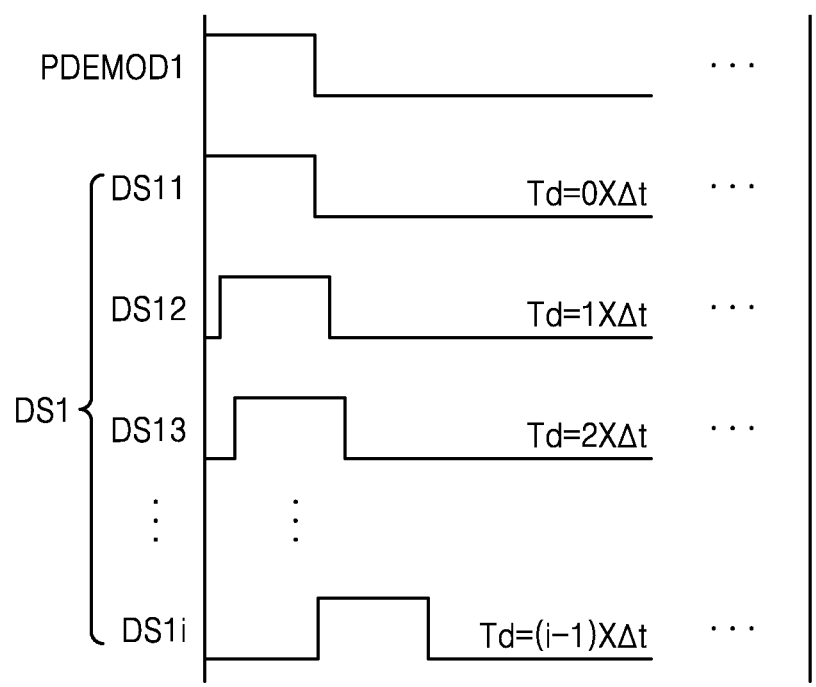
FIG. 6B is a timing diagram illustrating delay signals generated by a delay circuit of an image sensor according to an example embodiment.

FIG. 6B is a timing diagram illustrating delay signals generated by a delay circuit of an image sensor according to an example embodiment. The first delay signals DS1 generated from the first pre-demodulation signal PDEMOD1 are described with reference to FIG. 6B, and a corresponding description may be applied to the second to fourth delay signals DS2 to DS4 generated from each of the second to fourth demodulation signals PDEMOD2 to PDEMOD4.

Referring to FIGS. 4 and 6B, the delay circuit 124 may generate a plurality of first delay signals DS1 by respectively delaying the first pre-demodulation signal PDEMOD1 by designated plurality of delay phases. For example, based on the first pre-demodulation signal PDEMOD1, the delay time Td of the first signal DS11 among the plurality of first delay signals DS1 maybe 0×Δt, the delay time Td of the second signal DS12 among the plurality of first delay signals DS1 may be 1×Δt, the delay time Td of the third signal DS13 among the plurality of first delay signals DS1 may be 2×Δt, and the delay time of the i-th signal DS1$i$ among the plurality of first delay signals DS1 may be (i−1)×Δt. Here, i may be a natural number, for example, 4, 10, 20, 40, or the like. In an example embodiment, the delay time Td of the i-th signal DS1$i$ among the plurality of first delay signals DS1 may not exceed the delay time from the first pre-demodulation signal PDEMOD1 to the second pre-demodulation signal PDEMOD2.

Figure 7:
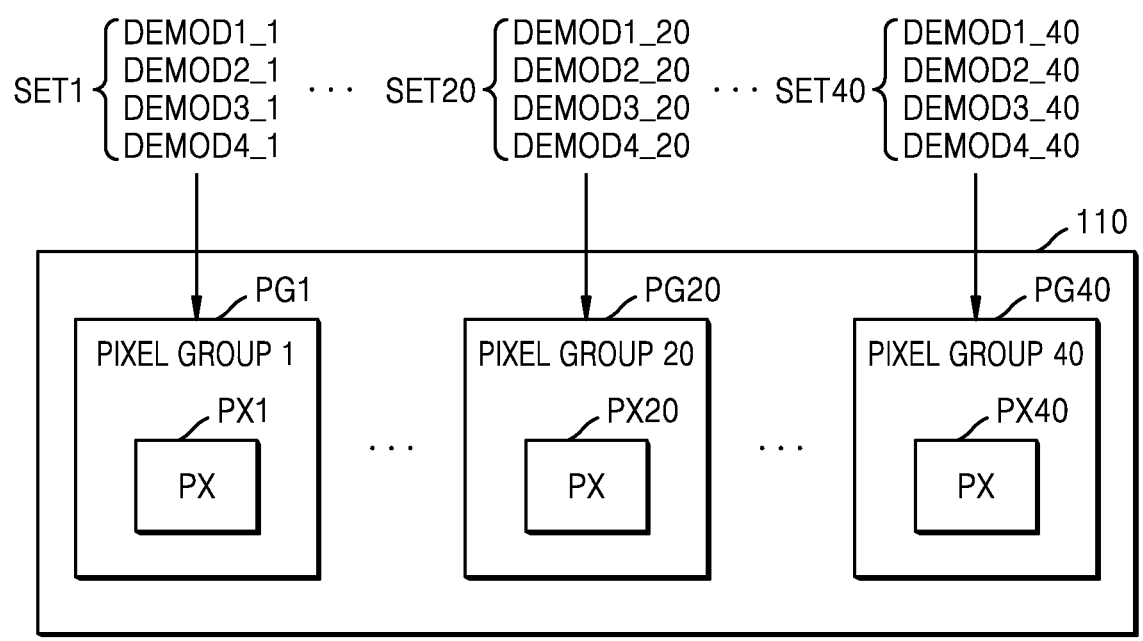
FIG. 7 is a block diagram illustrating a pixel array of an image sensor according to an example embodiment.
Figure 8:
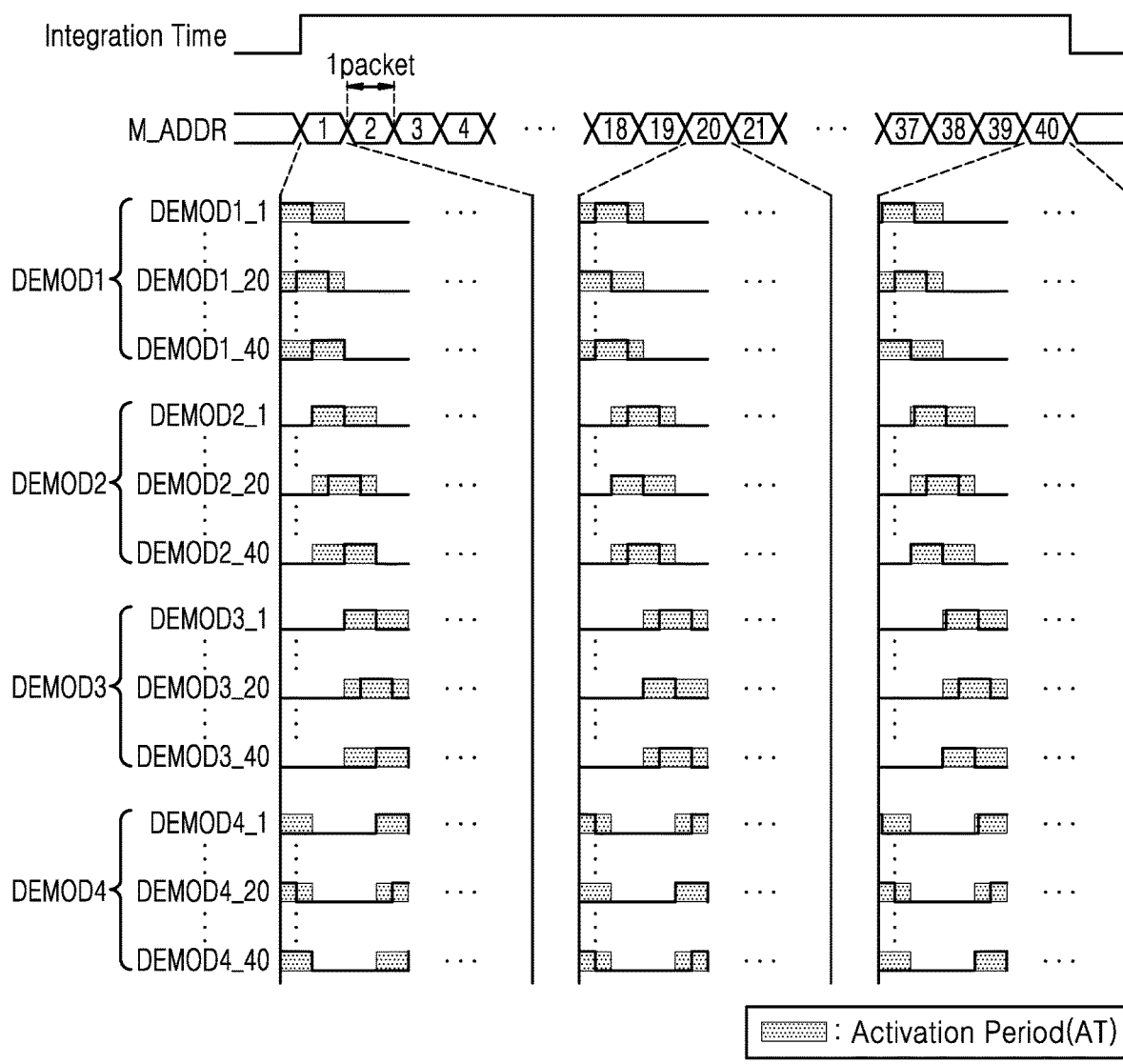
FIG. 8 is a timing diagram illustrating first to fourth demodulation signals provided to a pixel array based on an address according to an example embodiment.

FIG. 7 is a block diagram illustrating a pixel array of an image sensor according to an example embodiment. FIG. 8 is a timing diagram illustrating first to fourth demodulation signals provided to a pixel array based on an address according to an example embodiment.

Referring to FIG. 7, the pixel array 110 may include a plurality of pixel groups, for example, first to fortieth pixel groups PG1 to PG40. The number of pixel groups included in the pixel array 110 is 40 as an example. The number of pixel groups included in the pixel array 110 may be, for example, 4, 10, 20, or 40, and may be variously modified.

Each of the first to fortieth pixel groups PG1 to PG40 may include at least one pixel. The pixels included in the same pixel group among the first to fortieth pixel groups PG1 to PG40 may be pixels arranged side by side in a column direction, or may be pixels arranged side by side in a row direction. The first pixel group PG1 may include at least one first pixel PX1, the twentieth pixel group PG20 may include at least one twentieth pixel PX20, and the fortieth pixel group PG40 may include at least one fortieth pixel PX40.

A first signal set SET1 may be provided to the first pixel group PG1, a twentieth signal set SET20 may be provided to the twentieth pixel group PG20, and a fortieth signal set SET40 may be provided to the fortieth pixel group PG40. The first signal set SET1 may include first to fourth demodulation signals DEMOD1_1 to DEMOD4_1, the twentieth signal set SET20 may include first to fourth demodulation signals DEMOD1_20 to DEMOD4_20, and the fortieth signal set SET40 may include first to fourth demodulation signals DEMOD1_40 to DEMOD4_40.

The first to fourth demodulation signals DEMOD1_1 to DEMOD4_1 of the first signal set SET1 may have a phase difference of 90° from each other. The first demodulation signal DEMOD1_1 of the first signal set SET1 may be provided to the first transfer transistor of the first pixel PX1 of the first pixel group PG1, and the second demodulation signal DEMOD2_1 of the first signal set SET1 may be provided to the second transfer transistor of the first pixel PX1 of the first pixel group PG1. The third demodulation signal DEMOD3_1 of the first signal set SET1 may be provided to the third transfer transistor of the first pixel PX1 of the first pixel group PG1, and the fourth demodulation signal DEMOD4_1 of the first signal set SET1 maybe provided to the fourth transfer transistor of the first pixel PX1 of the first pixel group PG1.

The first to fourth demodulation signals DEMOD1_20 to DEMOD4_20 of the twentieth signal set SET20 may have a phase difference of 90° from each other. The first to fourth demodulation signals DEMOD1_40 to DEMOD4_40 of the fortieth signal set SET40 may have a phase difference of 90° from each other. The description of the first signal set SET1 may be similarly applied to the description of the second to fortieth signal sets SET2 to SET40.

Referring to FIGS. 7 and 8, the integration time may be divided into a plurality of packets, and the address M_ADDR may be changed for each of the plurality of packets. In an example embodiment, the address M_ADDR may have a value of 1 to 40. However, example embodiments are not limited thereto, and the number of values of the address M_ADDR may be 4, 10, 20, or 40, and may be variously changed.

An activation period AT may indicate a period in which a phase of each of the first to fourth demodulation signals DEMOD1 to DEMOD4 changes. That is, within the activation period AT, the phase of each of the first to fourth demodulation signals DEMOD1 to DEMOD4 may change according to the packet.

For the same address M_ADDR, phases of the first demodulation signals DEMOD1 for different pixel groups may be different from each other in the activation period AT. That is, within the activation period AT, phases of the first demodulation signal DEMOD1_1 of the first signal set SET1, the first demodulation signal DEMOD1_20 of the twentieth signal set SET20, and the first demodulation signal DEMOD1_40 of the fortieth signal set SET40 may be different from each other.

In addition, as the address M_ADDR is changed, a phase of each of the first demodulation signals DEMOD1 may be changed within the activation period AT. That is, as the address M_ADDR is incrementally changed from 1 to 40, the phase of the first demodulation signal DEMOD1_1 of the first signal set SET1 may be changed within the activation period AT, the phase of the first demodulation signal DEMOD1_20 of the twentieth signal set SET20 may be changed within the activation period AT, and the phase of the first demodulation signal DEMOD1_40 of the fortieth signal set SET40 may be changed within the activation period AT.

The description of the first demodulation signals DEMOD1 may be similarly applied to the second to fourth demodulation signals DEMOD2 to DEMOD4.

Because the first demodulation signals DEMOD1 include signals having different phases from each other (e.g., DEMOD1_1 to DEMOD1_40), generation of a peak current in the first demodulation signals DEMOD1 may be prevented. In addition, because the second demodulation signals DEMOD2 include signals having different phases from each other (e.g., DEMOD2_1 to DEMOD2_40), generation of a peak current in the second demodulation signals DEMOD2 may be prevented. For the same reason, generation of peak currents in the third demodulation signals DEMOD3 (including signals having different phases from each other (e.g., DEMOD3_1 to DEMOD3_40)) and the fourth demodulation signals DEMOD4 (including signals having different phases from each other (e.g., DEMOD4_1 to DEMOD4_40)) may be prevented.

By receiving the first to fourth delay signals DS1 to DS4 from the delay circuit (e.g., 124 in FIG. 4) and mixing the first to fourth delay signals DS1 to DS4 based on the address M_ADDR, the phase mixer (e.g., the phase mixer 125 of FIG. 4) may output, to the pixel array 110, the first to fourth demodulation signals DEMOD1 to DEMOD4 of which phases are changed for each predetermined time interval (packet). The number of the address M_ADDR may correspond to the number of delay signals generated by the delay circuit 124. Accordingly, all pixels of the pixel array 110 may receive all of the first to fourth delay signals DS1 to DS4 generated by the delay circuit 124 as the first to fourth demodulation signals DEMOD1 to DEMOD4 during the light integration time. This operation may be referred to as a multiple interleaving operation. Because the pixel array 110 receives the first to fourth demodulation signals DEMOD1 to DEMOD4 of which phases are changed within an integration section (for example, an integration time), a depth offset error may be prevented from occurring.

Figure 9:
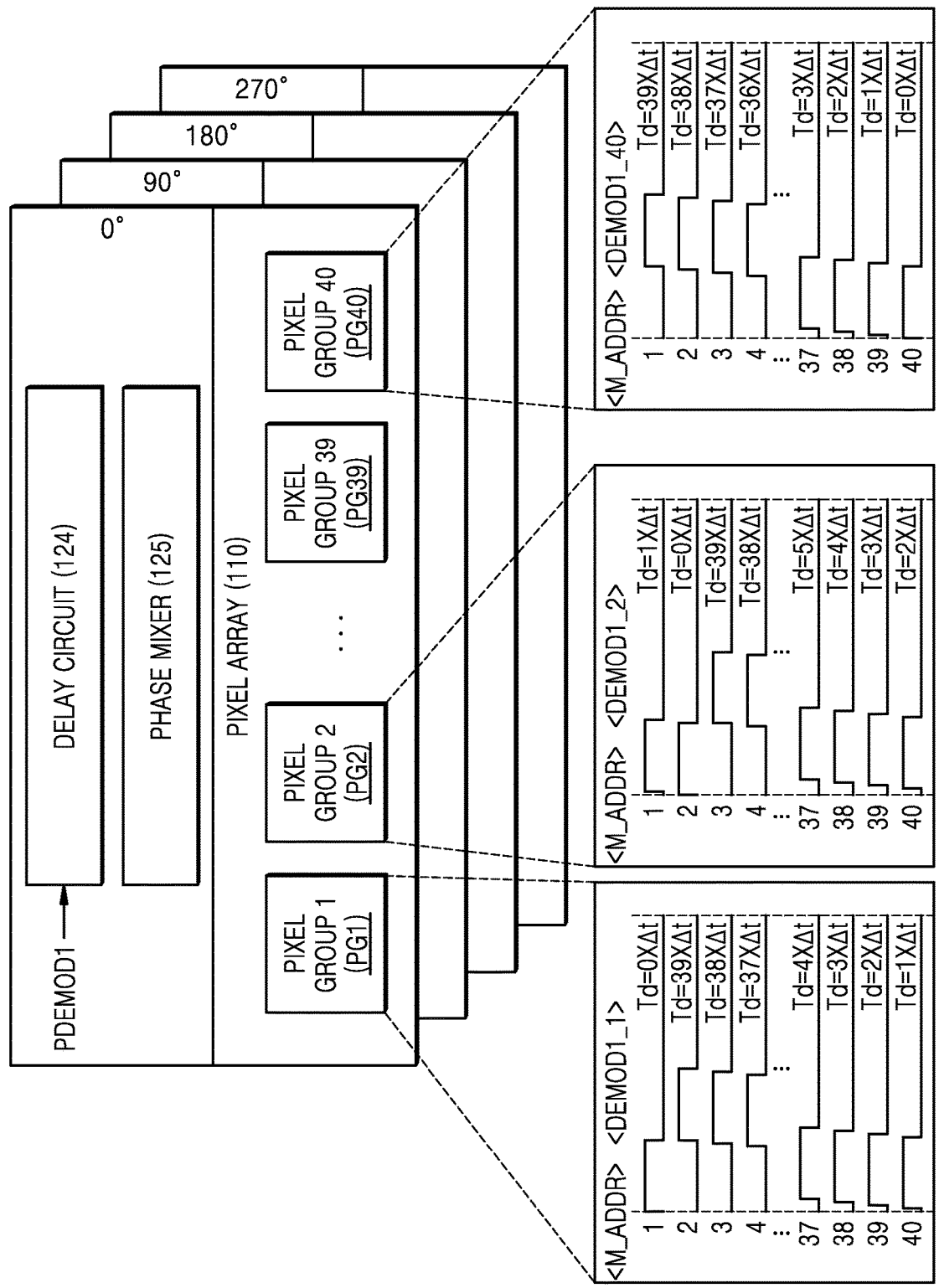
FIG. 9 is a diagram for describing a first demodulation signal provided to each of a plurality of pixel groups included in a pixel array according to an example embodiment.

FIG. 9 is a diagram for describing a first demodulation signal provided to each of a plurality of pixel groups included in a pixel array. FIG. 9 may be referred to together with FIG. 4.

In FIG. 9, the first demodulation signals DEMOD1 generated from the first pre-demodulation signal PDEMOD1 are mainly described, and a description similar to that of FIG. 9 may be applied to the second demodulation signals DEMOD2 generated from the second pre-demodulation signal PDEMOD2, the third demodulation signals DEMOD3 generated from the third pre-demodulation signal PDEMOD3, and fourth demodulation signals DEMOD4 generated from the fourth pre-demodulation signal PDEMOD4. When each of the first demodulation signals DEMOD1 has a phase of 0° as a reference, the second demodulation signals DEMOD2 corresponding to each of the first demodulation signals DEMOD1 may have a phase difference of 90°, the corresponding third demodulation signals DEMOD3 corresponding to each of the first demodulation signals DEMOD1 may have a phase difference of 180°, and the corresponding fourth demodulation signals DEMOD4 corresponding to each of the first demodulation signals DEMOD1 may have a phase difference of 270°.

Referring to FIG. 9, the delay circuit 124 may receive the first pre-demodulation signal PDEMOD1 and transmit a plurality of first delay signals to the phase mixer 125, and the phase mixer 125 may output the first demodulation signals DEMOD1, for example, DEMOD1_1 to DEMOD1_40, to the pixel array 110. The phase mixer 125 may output the first demodulation signal DEMOD1_1 to the first pixel group PG1, may output the first demodulation signal DEMOD1_2 to the second pixel group PG2, and may output the first demodulation signal DEMOD1_40 to the fortieth pixel group PG40.

A phase and a delay time Td of the first demodulation signal DEMOD1_1 of the first pixel group PG1 may vary depending on the address M_ADDR. For example, when the address M_ADDR changes to 1, 2, 3, 4, . . . , 37, 38, 39, or 40, the delay time Td of the first demodulation signal DEMOD1_1 of the first pixel group PG1 may change to 0×Δt, 39×Δt, 38×Δt, 37×Δt, 4×Δt, 3×Δt, 2×Δt, or 1×Δt. The change in the delay time Td of the first demodulation signal DEMOD1_1 based on the address M_ADDR described with reference to FIG. 9 may be variously modified as an example.

A phase and a delay time Td of the first demodulation signal DEMOD1_2 of the second pixel group PG2 may be changed depending on the address M_ADDR. The first demodulation signal DEMOD1_2 of the second pixel group PG2 may be offset from the first demodulation signal DEMOD1_1 of the first pixel group PG1. For example, when the address M_ADDR changes to 1, 2, 3, 4, . . . , 37, 38, 39, or 40, the delay time Td of the first demodulation signal DEMOD1_2 of the second pixel group PG2 may change to 1×Δt, 0×Δt, 39×Δt, 38×Δt, . . . , 5×Δt, 4×Δt, 3×Δt, or 2×Δt.

A phase and a delay time Td of the first demodulation signal DEMOD1_40 of the fortieth pixel group PG40 may be changed depending on the address M_ADDR. The first demodulation signal DEMOD1_40 of the fortieth pixel group PG40 may be offset from the first demodulation signals DEMOD1_1 through DEMOD1_39 of the first pixel group PG1 through the thirty-ninth pixel group PG39. For example, when the address M_ADDR changes to 1, 2, 3, 4, . . . , 37, 38, 39, or 40, the delay time Td of the first demodulation signal DEMOD1_40 of the fortieth pixel group PG40 may change to 39×Δt, 38×Δt, 37×Δt, 36×Δt, . . . , 3×Δt, 2×Δt, 1×Δt, or 0×Δt.

Figure 10:
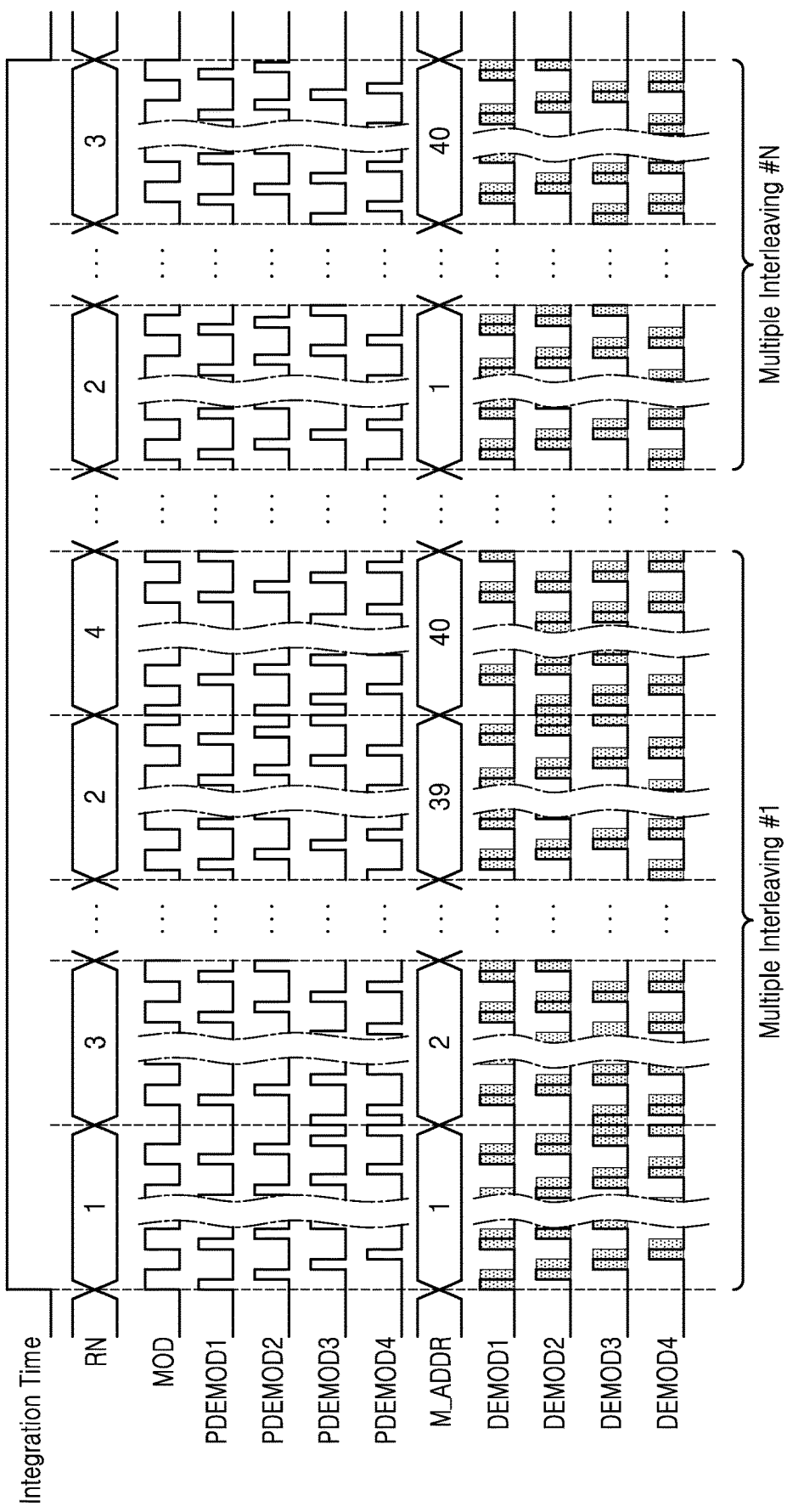
FIG. 10 is a timing diagram for explaining an operation of an image sensor including a pixel having a 4-tap structure according to an example embodiment.

FIG. 10 is a timing diagram for explaining an operation of an image sensor including a pixel having a 4-tap structure according to an example embodiment. The 4-tap structure may indicate a structure having taps capable of generating pixel signals based on four phases in one frame.

Referring to FIGS. 4 and 10, the delay circuit 124 may generate forty first delay signals DS1 by different delay phases from the first pre-demodulation signal PDEMOD1, forty second delay signals DS2 may be generated by different delay phases from the second pre-demodulation signal PDEMOD2, forty third delay signals DS3 may be generated by different delay phases from the third pre-demodulation signal PDEMOD3, and forty fourth delay signals DS4 may be generated by changing a delay phase from the fourth pre-demodulation signal PDEMOD4.

The address M_ADDR may be sequentially changed from 1 to 40 for each packet. The number of addresses M_ADDR may correspond to the number of delay signals generated by the delay circuit 124. As the address M_ADDR is changed, the phase mixer 125 may mix the first delay signals DS1 to generate the first demodulation signals DEMOD1, may mix the second delay signals DS2 to generate the second demodulation signals DEMOD2, may mix the third delay signals DS3 to generate the third demodulation signals DEMOD3, and may mix the fourth delay signals DS4 to generate the fourth demodulation signals DEMOD4.

Accordingly, the total number of packets within the integration time may be a multiple (N times, N is a natural number greater than or equal to 1) of the number of delay signals (e.g., the number of first delay signals DS1) generated by the delay circuit 124 based on one pre-demodulation signal. For example, when the delay circuit 124 generates delay signals having 40 different delay phases, the number of packets during the integration time may be a multiple of 40. The number of packets may be adjusted considering the operation accuracy of the image sensor and the operation speed of the image sensor.

In the image sensor according to an example embodiment, when the packet is changed, the phase difference between the modulation signal MOD, which operates the light source, and the first to fourth demodulation signals DEMOD1 to DEMOD4 input to the pixel array may not be fixed, and may be changed for each packet. Accordingly, the first to fourth demodulation signals DEMOD1 to DEMOD4 have an additional phase change regardless of a change in the modulation signal MOD depending on the change of the random number RN. Through this, it is possible to implement a high-performance camera with low peak current and high depth measurement accuracy.

Figure 11:
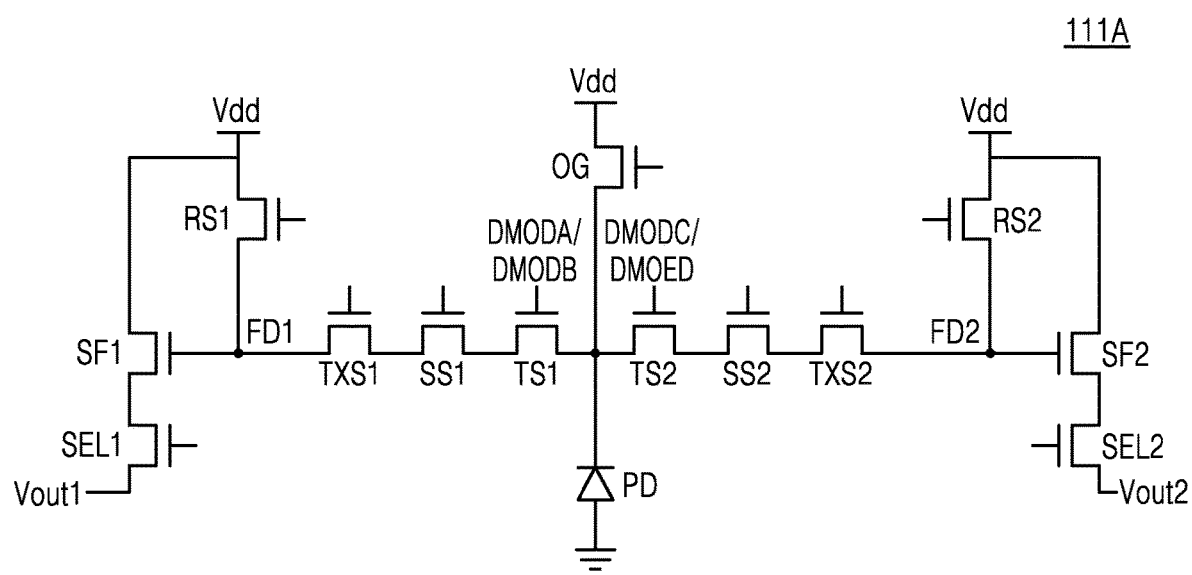
FIG. 11 is a view for explaining an example embodiment of the structure of the pixel shown in FIG. 2.

FIG. 11 is a view for explaining an example embodiment of the structure of the pixel shown in FIG. 2.

As illustrated in FIG. 11, pixel 111A may have a two-tap structure. The two-tap structure indicates a structure in which one pixel 111A includes two taps, and the tap may refer to a unit component capable of discriminating and transmitting the photocharges generated and accumulated in the pixel 111A for each phase as an external optical signal is irradiated by different phases.

An image sensor including pixels 111A having the two-tap structure (e.g., 14 in FIG. 2) may implement a method of transmitting with respect to 0°, 90°, 180°, and 2700 phases using two taps. For example, in an even frame (the first frame), based on the first tap of the pixel 111A, when the first tap generates the first pixel signal Vout1 with respect to a phase of 0°, the second tap may generate a second pixel signal Vout2 with respect to a phase of 180°, and in an odd frame, the first tap may generate a first pixel signal Vout1 with respect to a phase of 90°, and the second tap may generate a second pixel signal Vout2 with respect to a phase of 270°.

Referring to FIG. 11, the pixel 111A may include a photodiode PD, an overflow gate OG, transfer transistors TS1 and TS2, storage transistors SS1 and SS2, tap transfer transistors TXS1 and TXS2, reset transistors RS1 and RS2, source followers SF1 and SF2, and selection transistors SEL1 and SEL2. According to an example embodiment, at least one of the overflow gate OG, the storage transistors SS1 and SS2, the tap transfer transistors TXS1 and TXS2, the reset transistors RX1 and RX2, the source followers SF1 and SF2, and the select transistors SEL1 and SEL2 maybe omitted.

The first transfer transistor TS1 may transfer the charge generated by the photodiode PD depending on the first demodulation signal DEMODA to the first storage transistor SS1 in the even frame, and may transfer the charge generated by the photodiode PD depending on the second demodulation signal DEMODB to the first storage transistor SS1 in the odd frame. The second transfer transistor TS2 may transfer the charge generated by the photodiode PD depending on the third demodulation signal DEMODC to the second storage transistor SS2 in the even frame, and may transfer the charge generated by the photodiode PD depending on the fourth demodulation signal DEMODD to the second storage transistor SS2 in the odd frame. The first to fourth demodulation signals DEMODA to DEMODD may be included in the demodulation signals DEMOD of FIG. 2, and may be signals having the same frequency, the same duty ratio and different phases from each other. The first to fourth demodulation signals DEMODA to DEMODD may have a phase difference of 90° from each other. For example, when the first demodulation signal DEMODA has a phase of 0° with respect to the first demodulation signal DEMODA, the second demodulation signal DEMODB may have a phase of 90°, the third demodulation signal DEMODC may have a phase of 180°, and the fourth demodulation signal DEMODD may have a phase of 270°.

The pixel 111A may accumulate photocharges during the integration time in the even frame and output the first pixel signal Vout1 and the second pixel signal Vout2 generated based on the accumulation result to the readout circuit (e.g., 130 of FIG. 2). In addition, the pixel 111A may accumulate photocharges during an integration time in an odd frame and output the first pixel signal Vout1 and the second pixel signal Vout2 generated according to the accumulation result to the readout circuit 130.

Figure 12:
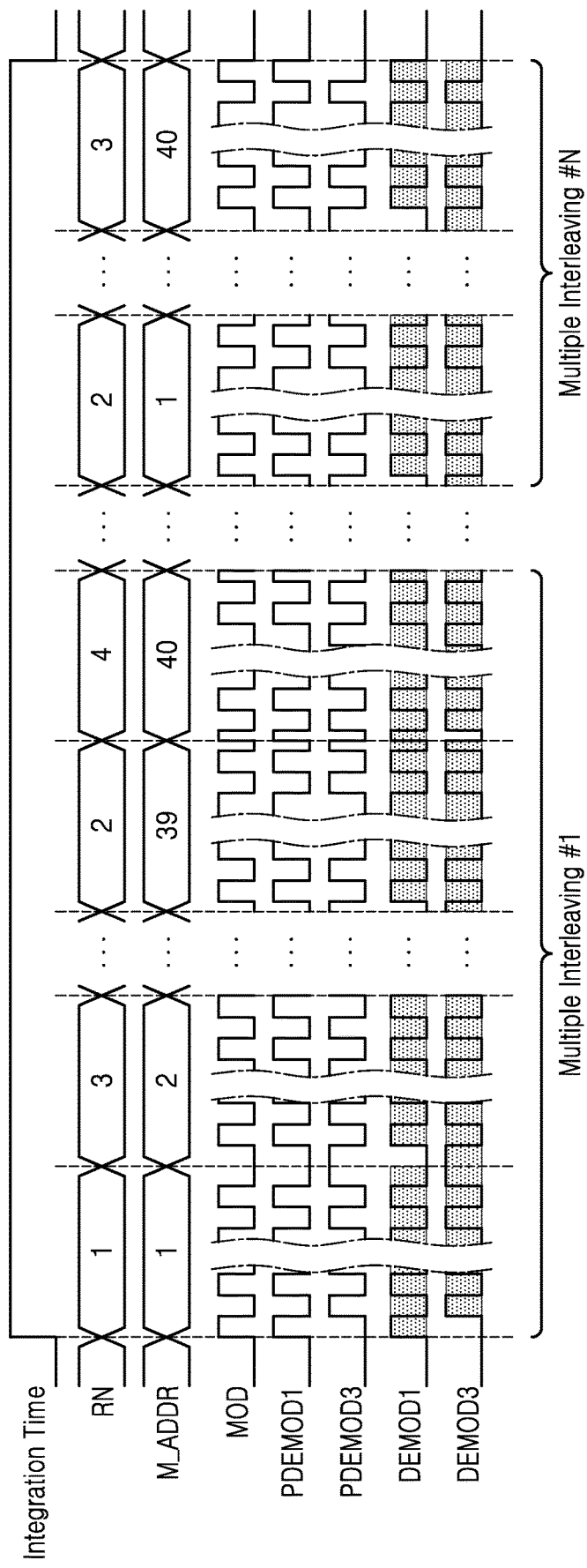
FIGS. 12 and 13 are timing diagrams for explaining an operation of an image sensor including a pixel having a two-tap structure according to an example embodiment.
Figure 13:
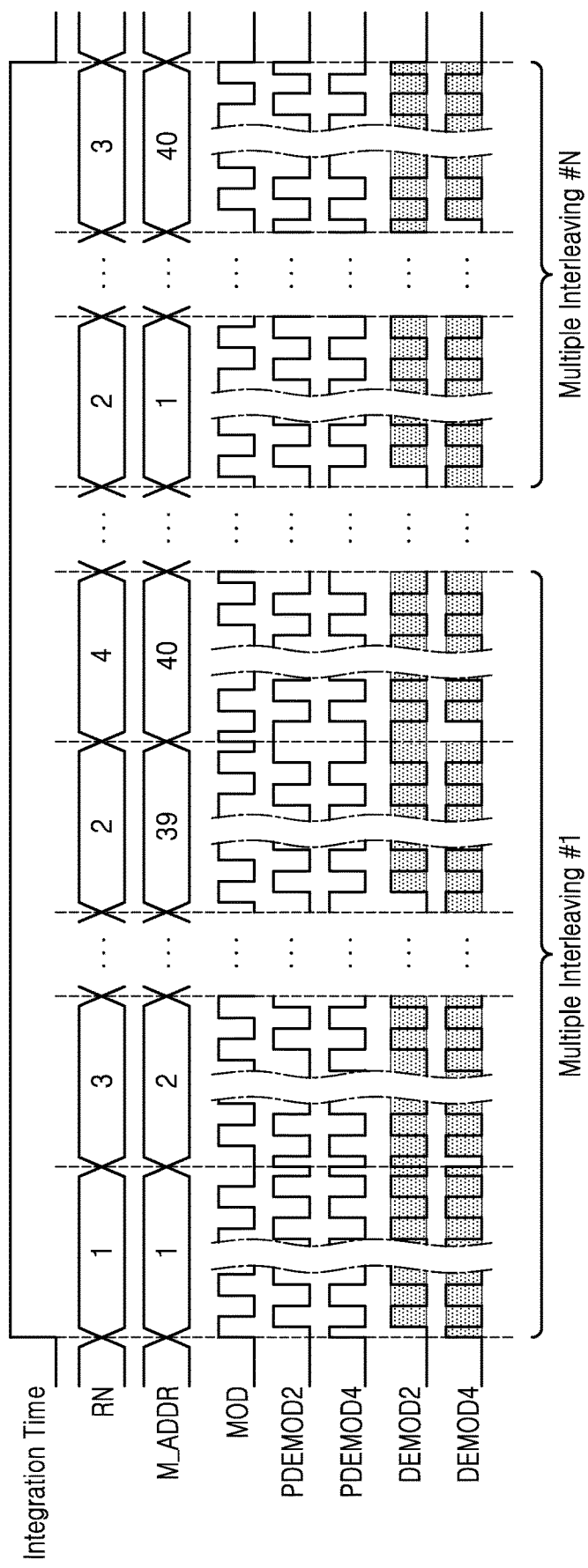

FIGS. 12 and 13 are timing diagrams for explaining an operation of an image sensor including a pixel having a two-tap structure according to an example embodiment. FIG. 12 is a diagram for explaining an operation of an image sensor in an even frame, and FIG. 13 is a diagram for explaining an operation of an image sensor in an odd frame. The even frame and the odd frame may be alternately performed with each other. Each of the first to fourth demodulation signals DEMOD1 to DEMOD4 in FIGS. 12 and 13 may be applied to each of the first to fourth demodulation signals DEMODA to DEMODD of FIG. 11.

Referring to FIGS. 12 and 13, a duty ratio of the modulation signal MOD may be 50%, and a duty ratio of each of the first to fourth pre-demodulation signals PDEMOD1 to PDEMOD4 may be 50%. However, the duty ratio of each of the first to fourth pre-demodulation signals PDEMOD1 to PDEMOD4 maybe freely modified.

In the even frame, a first pre-demodulation signal PDEMOD1 and a third pre-demodulation signal PDEMOD3 may be generated. A phase difference of the third pre-demodulation signal PDEMOD3 with respect to the phase of the first pre-demodulation signal PDEMOD1 may be 180°. The delay circuit (e.g., the delay circuit 124 of FIG. 4) may generate a designated number (e.g., 40) of first delay signals DS1 by different delay phases from the first pre-demodulation signal PDEMOD1, and may generate forty third delay signals DS3 by changing a delay phase from the third pre-demodulation signal PDEMOD3.

A second pre-demodulation signal PDEMOD2 and a fourth pre-demodulation signal PDEMOD4 may be generated in the odd frame. A phase difference of the second pre-demodulation signal PDEMOD2 with respect to the phase of the first pre-demodulation signal PDEMOD1 may be 90°, and a phase difference of the fourth pre-demodulation signal with respect to the phase of the first pre-demodulation signal PDEMOD1 PDEMOD4 may be 270°. The delay circuit 124 may generate 40 second delay signals DS2 by different delay phases from the second pre-demodulation signal PDEMOD2, and 40 fourth delay signals DS4 may be generated by changing a delay phase from the fourth pre-demodulation signal PDEMOD4.

The address M_ADDR may be sequentially changed from 1 to 40 for each packet. The number of addresses M_ADDR may correspond to the number of delay signals generated by the delay circuit 124. In the even frame, as the address M_ADDR is changed, the phase mixer (e.g., the phase mixer 125 of FIG. 4) may mix the first delay signals DS1 to generate the first demodulation signals DEMOD1, and may mix the third delay signals DS3 to generate third demodulation signals DEMOD3. As the address M_ADDR is changed in the odd frame, the phase mixer 125 may mix the second delay signals DS2 to generate the second demodulation signals DEMOD2, and may mix the fourth delay signals DS4 to generate fourth demodulation signals DEMOD4.

The two-tap structure has the advantage that the configuration of the pixel is simpler than the 4-tap structure, and the 4-tap structure has an advantage in that pixel signals based on four phases (0°, 90°, 180°, and 270°) may be generated within one frame, compared to the two-tap structure.

Figure 14:
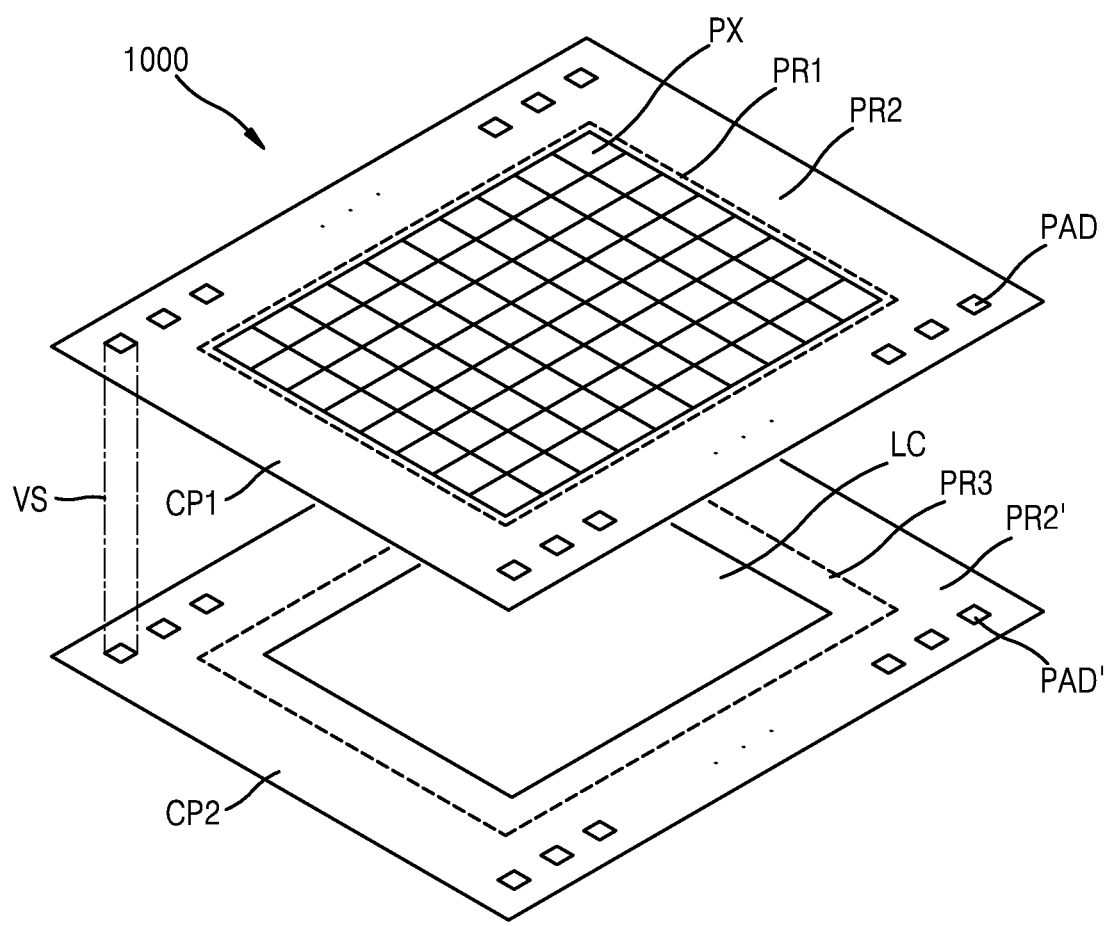
FIG. 14 is a schematic diagram illustrating an image sensor according to an example embodiment.

FIG. 14 is a schematic diagram illustrating an image sensor according to an example embodiment.

Referring to FIG. 14, an image sensor 1000 may be a stacked image sensor including a first chip CP1 and a second chip CP2 stacked in a vertical direction. The image sensor 14 described with reference to FIG. 1 may be implemented as the image sensor 1000.

The first chip CP1 may include a pixel region PR1 and a pad region PR2, and the second chip CP2 may include a peripheral circuit region PR3 and a lower pad region PR2'. A pixel array in which a plurality of pixels PX are disposed may be formed in the pixel region PR1, and may include the pixel array 110 described with reference to FIGS. 2, 7, and 9.

The peripheral circuit region PR3 of the second chip CP2 may include a logic circuit block LC and may include a plurality of transistors. For example, the logic circuit block LC may include at least a portion of the control circuit 120 and the readout circuit 130 described with reference to FIG. 2. The peripheral circuit region PR3 may provide a constant signal to each of the plurality of pixels PX included in the pixel region PR1, and may read a pixel signal output from each of the plurality of pixels PX.

The lower pad region PR2' of the second chip CP2 may include a lower conductive pad PAD'. The lower conductive pad PAD' may be plural, and may each correspond to a conductive pad PAD. The lower conductive pad PAD' may be electrically connected to the conductive pad PAD of the first chip CP1 by the via structure VS.

In some example embodiments, each of the components, elements, modules or units represented by a block as illustrated in FIGS. 1, 2, 4, 5 and 9 may be implemented as various numbers of hardware, software and/or firmware structures that execute respective functions described above, according to example embodiments. For example, at least one of these components, elements, modules or units may include various hardware components including a digital circuit, a programmable or non-programmable logic device or array, an application specific integrated circuit (ASIC), transistors, capacitors, logic gates, or other circuitry using a direct circuit structure, such as a memory, a processor, a logic circuit, a look-up table, etc., that may execute the respective functions through controls of one or more microprocessors or other control apparatuses. Also, at least one of these components, elements, modules or units may include a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:
1. An image sensor comprising:
 a demodulation clock generation circuit configured to generate first to fourth demodulation clock signals respectively having first to fourth phases;
 a demodulation phase selection circuit configured to generate first to fourth pre-demodulation signals based on the first to fourth demodulation clock signals and a random number that changes for each of a plurality of packets;
 a delay circuit configured to generate a plurality of first delay signals by delaying the first pre-demodulation signal by a plurality of delay phases, a plurality of second delay signals by delaying the second pre-demodulation signal by the plurality of delay phases, a plurality of third delay signals by delaying the third pre-demodulation signal by the plurality of delay phases, and a plurality of fourth delay signals by delaying the fourth pre-demodulation signal by the plurality of delay phases; and a phase mixer configured to generate a plurality of first demodulation signals of which phases are changed based on an address that changes for each of the plurality of packets, a plurality of second demodulation signals of which phases are changed based on the address, a plurality of third demodulation signals of which phases are changed based on the address, and a plurality of fourth demodulation signals of which phases are changed based on the address, wherein the first to fourth phases have a phase difference of 90° from each other.

2. The image sensor of claim 1, further comprising a random number generation circuit configured to generate the random number for each of the plurality of packets and provide the random number to the demodulation phase selection circuit.

3. The image sensor of claim 1, further comprising:
a modulation clock generation circuit configured to generate first to fourth modulation clock signals respectively having the first to fourth phases; and
a modulation phase selection circuit configured to output one of the first to fourth modulation clock signals as a modulation signal based on the random number.

4. The image sensor of claim 1,
wherein the demodulation phase selection circuit comprises:
a first selection circuit configured to output a first one of the first to fourth demodulation clock signals as the first pre-demodulation signal based on the random number;
a second selection circuit configured to output a second one of the first to fourth demodulation clock signals as the second pre-demodulation signal based on the random number;
a third selection circuit configured to output a third one of the first to fourth demodulation clock signals as the third pre-demodulation signal based on the random number; and
a fourth selection circuit configured to output a fourth one of the first to fourth demodulation clock signals as the fourth pre-demodulation signal based on the random number.

5. The image sensor of claim 4, wherein, with respect to the first pre-demodulation signal, a phase difference of the second pre-demodulation signal is 90°, a phase difference of the third pre-demodulation signal is 180°, and a phase difference of the fourth pre-demodulation signal is 270°.

6. The image sensor of claim 1, further comprising:
a pixel array comprising a plurality of pixels, each of which comprises four transistors configured to generate first to fourth pixel signals based on the first to fourth demodulation signals, respectively.

7. The image sensor of claim 6, wherein each of the plurality of pixels is configured to receive the plurality of first to fourth demodulation signals within one frame.

8. The image sensor of claim 1, further comprising:
a pixel array comprising a plurality of pixels, each of which comprises two transistors configured to generate a first pixel signal and a second pixel signal, respectively.

9. The image sensor of claim 8,
wherein the plurality of pixels receive the plurality of first demodulation signals and the plurality of third demodulation signals in a first frame, and receive the plurality of second demodulation signals and the plurality of fourth demodulation signals in a second frame following the first frame.

10. The image sensor of claim 1,
further comprising a pixel array comprising a plurality of pixel groups,
wherein each of the plurality of pixel groups is configured to:
receive a first demodulation signal having a different phase from among the plurality of first demodulation signals,
receive a second demodulation signal having a different phase from among the plurality of second demodulation signals,
receive a third demodulation signal having a different phase from among the plurality of third demodulation signals, and
receive a fourth demodulation signal having a different phase from among the plurality of fourth demodulation signals.

11. An image sensor comprising:
a pixel array comprising a first group of pixels and a second group of pixels; and
a control circuit configured to provide a modulation signal to a light source and provide, to the pixel array, a plurality of first demodulation signals of which phases are changed, based on a random number and an address, a plurality of second demodulation signals of which phases are changed based on the random number and the address, a plurality of third demodulation signals of which phases are changed based on the random number and the address, and a plurality of fourth demodulation signals of which phases are changed based on the random number and the address,
wherein the first to fourth demodulation signals provided to the first group of pixels have different phases than the first to fourth demodulation signals provided to the second group of pixels,
an integration time corresponding to one frame comprises a plurality of packets, and
the random number and the address are changed for each of the plurality of packets.

12. The image sensor of claim 11,
wherein the control circuit comprises:
a random number generation circuit configured to generate the random number for each of the plurality of packets;
a demodulation clock generation circuit configured to generate first to fourth demodulation clock signals having different phases;
a demodulation phase selection circuit configured to generate first to fourth pre-demodulation signals based on the random number and the first to fourth demodulation clock signals;
a delay circuit configured to generate a plurality of first delay signals by delaying the first pre-demodulation signal by a plurality of delay phases, a plurality of second delay signals by delaying the second pre-demodulation signal by the plurality of delay phases, a plurality of third delay signals by delaying the third pre-demodulation signal by the plurality of delay phases, and a plurality of fourth delay signals by delaying the fourth pre-demodulation signal by the plurality of delay phases; and a phase mixer configured to output the plurality of first to fourth demodulation signals to the pixel array based on the address and the plurality of first to fourth delay signals.

13. The image sensor of claim 12, wherein a number of packets is a multiple of a number of the plurality of delay phases.

14. The image sensor of claim 12, wherein a number of addresses is equal to a number of the plurality of delay phases.

15. A camera comprising:
a light source; and
an image sensor comprising:
   a pixel array comprising a plurality of pixels configured to receive a light signal generated by the light source and reflected from an object; and
   a control circuit configured to provide a modulation signal to the light source and provide, to the pixel array, a plurality of first demodulation signals of which phases are changed based on a random number and an address, a plurality of second demodulation signals of which phases are changed based on the random number and the address, a plurality of third demodulation signals of which phases are changed based on the random number and the address, and a plurality of fourth demodulation signals of which phases are changed based on the random number and the address,
wherein, an integration time corresponding to one frame comprises a plurality of packets, and
the random number and the address are changed for each of the plurality of packets.

16. The camera of claim 15,
wherein the pixel array comprises a plurality of pixel groups, and
the plurality of first demodulation signals are respectively provided to different pixel groups among the plurality of pixel groups, and have different phases from each other.

17. The camera of claim 15,
wherein the control circuit comprises:
a random number generation circuit configured to generate the random number for each of the plurality of packets;
a demodulation clock generation circuit configured to generate first to fourth demodulation clock signals;
a demodulation phase selection circuit configured to generate first to fourth pre-demodulation signals based on the random number and the first to fourth demodulation clock signals;
a delay circuit configured to generate a plurality of first delay signals by delaying the first pre-demodulation signal by a plurality of delay phases, a plurality of second delay signals by delaying the second pre-demodulation signal by the plurality of delay phases, a plurality of third delay signals by delaying the third pre-demodulation signal by the plurality of delay phases, and a plurality of fourth delay signals by delaying the fourth pre-demodulation signal by the plurality of delay phases; and
a phase mixer configured to output the plurality of first to fourth demodulation signals to the pixel array based on the address and the plurality of first to fourth delay signals.

18. The camera of claim 17, wherein a number of packets is a multiple of a number of the plurality of delay phases.

19. The camera of claim 17, wherein the plurality of pixels receive all of the plurality of first to fourth delay signals as the plurality of first to fourth demodulation signals within one frame.

20. The camera of claim 15,
wherein the control circuit comprises:
a modulation clock generation circuit configured to generate first to fourth modulation clock signals; and
a modulation phase selection circuit configured to output one of the first to fourth modulation clock signals as the modulation signal based on the random number.

* * * * *